United States Patent
Davis et al.

(10) Patent No.: US 10,887,291 B2
(45) Date of Patent: Jan. 5, 2021

(54) SECURE DATA DISTRIBUTION OF SENSITIVE DATA ACROSS CONTENT DELIVERY NETWORKS

(71) Applicant: Amazon Technologies, Inc., Seattle, WA (US)

(72) Inventors: Melissa Elaine Davis, Edmonds, WA (US); Gavin Richard Jewell, Seattle, WA (US); Brady Montz, Issaquah, WA (US); Alec Peterson, Lake Forest Park, WA (US); Igor Spac, Iasi (RO); Alex Jennifer Tribble, Seattle, WA (US); Radu Weiss, Bucharest (RO)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/382,579

(22) Filed: Dec. 16, 2016

(65) Prior Publication Data

US 2018/0176193 A1 Jun. 21, 2018

(51) Int. Cl.
*H04L 29/06* (2006.01)
*H04L 9/32* (2006.01)
*H04L 29/08* (2006.01)

(52) U.S. Cl.
CPC ........ *H04L 63/0435* (2013.01); *H04L 9/3247* (2013.01); *H04L 63/029* (2013.01); *H04L 63/0272* (2013.01); *H04L 63/0281* (2013.01); *H04L 63/0428* (2013.01); *H04L 63/0442* (2013.01); *H04L 63/0471* (2013.01);
(Continued)

(58) Field of Classification Search
CPC ............. H04L 63/0471; H04L 63/0435; H04L 63/0442; H04L 63/0428; H04L 67/28; H04L 67/10; H04L 67/02; H04L 63/166; H04L 63/06; H04L 63/029;
(Continued)

(56) References Cited

U.S. PATENT DOCUMENTS 6,915,433 B1 7/2005 Barber
8,385,555 B2 2/2013 Tang et al.
(Continued)

FOREIGN PATENT DOCUMENTS

AU 2012250524 A1 11/2013
EP 3005646 A1 4/2016
(Continued)

OTHER PUBLICATIONS

Merkle, J., and M. Lochter, "Elliptic Curve Cryptography (ECC) Brainpool Curves for Transport Layer Security (TLS)," Request for Comments: 7027, Informational, Oct. 2013, 11 pages.
(Continued)

*Primary Examiner* — Trong H Nguyen
(74) *Attorney, Agent, or Firm* — Davis Wright Tremaine LLP

(57) ABSTRACT

A computing resource service provider may operate a secure proxy fleet within a content delivery network. The secure proxy fleet may protect sensitive data communicated between a client device and a backend service over one or more networks, for example, over the content delivery network to a computing resource service provider environment. The secure proxy fleet may protect sensitive data by encrypting the sensitive data before it is forwarded to a destination.

21 Claims, 14 Drawing Sheets

(52) U.S. Cl.
CPC ............ *H04L 63/06* (2013.01); *H04L 63/166* (2013.01); *H04L 67/02* (2013.01); *H04L 67/10* (2013.01); *H04L 67/28* (2013.01); *H04L 2463/062* (2013.01)

(58) Field of Classification Search
CPC ............ H04L 63/0281; H04L 63/0272; H04L 9/3247; H04L 2463/062
See application file for complete search history.

(56) References Cited

U.S. PATENT DOCUMENTS

| | | | |
|---|---|---|---|
| 8,416,709 B1* | 4/2013 | Marshall | H04L 41/0806 370/252 |
| 8,601,263 B1 | 12/2013 | Shankar et al. | |
| 8,782,403 B1 | 7/2014 | Satish et al. | |
| 9,003,200 B1 | 4/2015 | Gardner | |
| 9,268,958 B1* | 2/2016 | Kessler | G06F 21/62 |
| 9,521,000 B1 | 12/2016 | Roth et al. | |
| 9,729,518 B1 | 8/2017 | Atsatt | |
| 2005/0177724 A1 | 8/2005 | Ali et al. | |
| 2005/0234828 A1 | 10/2005 | Matsuyama et al. | |
| 2006/0123226 A1 | 6/2006 | Kumar et al. | |
| 2006/0242412 A1 | 10/2006 | Jung et al. | |
| 2007/0079117 A1 | 4/2007 | Bhogal et al. | |
| 2007/0130464 A1* | 6/2007 | Swedor | H04L 63/0442 713/170 |
| 2007/0245416 A1* | 10/2007 | Dickinson, III | H04L 51/12 726/14 |
| 2007/0276958 A1* | 11/2007 | Curtis | H04L 63/0272 709/238 |
| 2007/0294539 A1* | 12/2007 | Shulman | G06F 17/30436 713/186 |
| 2008/0084996 A1 | 4/2008 | Chen et al. | |
| 2008/0289019 A1 | 11/2008 | Lam | |
| 2009/0106550 A1 | 4/2009 | Mohamed | |
| 2009/0252323 A1 | 10/2009 | Cooper | |
| 2009/0300719 A1 | 12/2009 | Ferris | |
| 2010/0005483 A1 | 1/2010 | Rao | |
| 2010/0063988 A1 | 3/2010 | Khalid et al. | |
| 2010/0104101 A1* | 4/2010 | Dickinson | G06F 21/32 380/277 |
| 2010/0205441 A1 | 8/2010 | Sandberg et al. | |
| 2010/0292556 A1 | 11/2010 | Golden | |
| 2011/0016156 A1 | 1/2011 | Golobay et al. | |
| 2011/0078285 A1 | 3/2011 | Hawkins et al. | |
| 2011/0145573 A1 | 6/2011 | Nakai et al. | |
| 2011/0161656 A1* | 6/2011 | Rao | G06F 21/335 713/153 |
| 2013/0046995 A1 | 2/2013 | Movshovitz | |
| 2013/0070925 A1 | 3/2013 | Yamada et al. | |
| 2013/0086379 A1 | 4/2013 | Shimizu | |
| 2013/0091351 A1 | 4/2013 | Manges | |
| 2014/0195798 A1 | 7/2014 | Brugger et al. | |
| 2014/0229737 A1 | 8/2014 | Roth et al. | |
| 2014/0373165 A1* | 12/2014 | Margolin | G06F 21/606 726/26 |
| 2015/0019858 A1* | 1/2015 | Roth | H04L 63/20 713/150 |
| 2015/0074393 A1 | 3/2015 | Zhang | |
| 2015/0222603 A1 | 8/2015 | Uzun et al. | |
| 2015/0244517 A1 | 8/2015 | Nita | |
| 2015/0294117 A1 | 10/2015 | Cucinotta et al. | |
| 2016/0055770 A1 | 2/2016 | Li | |
| 2016/0072927 A1 | 3/2016 | Xue et al. | |
| 2016/0261418 A1 | 9/2016 | Keene et al. | |
| 2017/0034237 A1 | 2/2017 | Silver | |
| 2017/0048254 A1 | 2/2017 | Avi-Dan et al. | |
| 2017/0093916 A1 | 3/2017 | Arumugam et al. | |
| 2017/0126638 A1* | 5/2017 | Ye | H04L 63/0471 |
| 2017/0142191 A1 | 5/2017 | Caldwell | |
| 2017/0171200 A1 | 6/2017 | Bao et al. | |
| 2017/0201495 A1 | 7/2017 | Cooley | |
| 2018/0011867 A1 | 1/2018 | Bowman et al. | |
| 2018/0063275 A1 | 3/2018 | Kolhi et al. | |
| 2018/0130062 A1 | 5/2018 | O'Donnell et al. | |
| 2018/0199190 A1 | 7/2018 | Khan et al. | |
| 2018/0218446 A1 | 8/2018 | Ries et al. | |
| 2018/0247302 A1 | 8/2018 | Armstrong et al. | |
| 2019/0014094 A1 | 1/2019 | Le Saint | |
| 2019/0044940 A1 | 2/2019 | Khalil et al. | |
| 2019/0207914 A1 | 7/2019 | Gong et al. | |

FOREIGN PATENT DOCUMENTS

| | | |
|---|---|---|
| JP | H01161457 A | 6/1989 |
| JP | 2002-82609 A | 3/2002 |
| JP | 2002-297606 A | 10/2002 |
| JP | 2004-206573 A | 7/2004 |
| JP | 2005-234759 A | 9/2005 |
| JP | 2005-309846 A | 11/2005 |
| JP | 2009-044320 A | 2/2009 |
| JP | 2015-505994 A | 2/2015 |
| JP | 2015-090993 A | 5/2015 |
| JP | 2015-126320 A | 7/2015 |
| JP | 2016-508699 A | 3/2016 |
| JP | 2016-054430 A | 4/2016 |
| JP | 2016-146618 A | 8/2016 |
| JP | 2016-524429 A | 8/2016 |
| WO | 2008146332 A1 | 12/2008 |

OTHER PUBLICATIONS

Gutmann, P., "Encrypt-then-MAC for Transport Layer Security (TLS) and Datagram Transport Layer Security (DTLS)," Request for Comments: 7366, Standards Track, Sep. 2014, 7 pages.
Atkinson, R., "Security Architecture for the Internet Protocol," Request for Comments: 1825, Standards Track, Aug. 1995, 23 pages.
Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Metzger, P., et al., "IP Authentication Using Keyed MD5," Request for Comments: 1828, Standards Track, Aug. 1995, 6 pages.
Karn, P., et al., "The ESP DES-CBC Transform," Request for Comments: 1829, Standards Track, Aug. 1995, 11 pages.
Dierks, T., et al., "The TLS Protocol Version 1.0," Request for Comments: 2246, Standards Track, Jan. 1999, 75 pages.
Kent, S., and R. Atkinson, "Security Architecture for the Internet Protocol," Request for Comments: 2401, Standards Track, Nov. 1998, 62 pages.
Orman, H., "The OAKLEY Key Determination Protocol," Request for Comments: 2412, Informational, Nov. 1998, 56 pages.
Newman, C., "Using TLS with IMAP, POP3 and ACAP," Request for Comments: 2595, Standards Track, Jun. 1999, 16 pages.
Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 8 pages.
Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 8 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.

(56) References Cited

OTHER PUBLICATIONS

Moriai, S., et al., "Addition of Camellia Cipher Suites to Transport Layer Security (TLS)," Request for Comments: 4132, Standards Track, Jul. 2005, 8 pages.
Lee, H.J., et al., "Addition of SEED Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Eronen, P., and H. Tschofenig, "Pre-Shared Key Ciphersuites for Transport Layer Security (TLS)," Request for Comments: 4279, Standards Track, Dec. 2005, 16 pages.
Kent, S., and K. Seo, "Security Architecture for the Internet Protocol," Request for Comments: 4301, Standards Track, Dec. 2005, 102 pages.
Kent, S., "IP Encapsulating Security Payload (ESP)," Request for Comments: 4303, Standards Track, Dec. 2005, 45 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.
Dierks, T., and E. Rescorla, "The Transport Layer Security (TLS) Protocol Version 1.2," Request for Comments: 5246, Standards Track, Aug. 2008, 98 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Rescorla, E., et al., "Transport Layer Security (TLS) Renegotiation Indication Extension," Request for Comments: 5746, Standards Track, Feb. 2010, 16 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Eastlake, D., "Transport Layer Security (TLS) Extensions: Extension Definitions," Request for Comments: 6066, Standards Track, Jan. 2011, 25 pages.
Tuexen, M., et al., "Datagram Transport Layer Security (DTLS) for Stream Control Transmission Protocol (SCTP)," Request for Comments: 6083, Standards Track, Jan. 2011, 10 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Turner, S., and T. Polk, "Prohibiting Secure Sockets Layer (SSL) Version 2.0," Request for Comments: 6176, Standards Track, Mar. 2011, 4 pages.
Kim, W., et al., "Addition of the ARIA Cipher Suites to Transport Layer Security (TLS)," Request for Comments: 6209, Informational, Apr. 2011, 10 pages.
Rescorla, E., and N. Modadugu, "Datagram Transport Layer Security Version 1.2," Request for Comments: 6347, Standards Track, Jan. 2012, 33 pages.
Kanno, S., and M. Kanda, "Addition of the Camellia Cipher Suites to Transport Layer Security (TLS)," Request for Comments: 6367, Informational, Sep. 2011, 9 pages.
Salter, M., and R. Housley, "Suite B Profile for Transport Layer Security (TLS)," Request for Comments: 6460, Informational, Jan. 2012, 15 pages.
McGrew, D., and D. Bailey, "AES-CCM Cipher Suites for Transport Layer Security (TLS)," Request for Comments: 6655, Standards Track, Jul. 2012, 8 pages.
International Search Report and Written Opinion dated Apr. 5, 2018, International Patent Application No. PCT/US2017/066170, dated Dec. 13, 2017, 13 pages.
International Search Report and Written Opinion dated Apr. 6, 2018, International Patent Application No. PCT/US2017/066165, filed Dec. 13, 2017, 16 pages.
International Search Report and Written Opinion dated Mar. 7, 2018, International Patent Application No. PCT/US2017/066171, filed Dec. 13, 2017, 17 pages.
Dworkin, M., "Recommendation for Block Cipher Modes of Operation: Galois/Counter Mode (GCM) and GMAC," NIST Special Publication 800-38D, Nov. 2007, 39 pages.
U.S. Appl. No. 16/003,889, filed Jun. 8, 2018.
Indian First Examination Report dated Oct. 15, 2020, Patent Application No. 201917027338, 7 pages.
Japanese Non Final Notice of Rejection dated Sep. 29, 2020, Patent Application No. 2019-528633, 1 page.
Japanese Non Final Notice of Rejection dated Sep. 29, 2020, Patent Application No. 2019-531792, 2 pages.
Japanese Notice of Reasons for Rejection dated Oct. 6, 2020, Patent Application No. 2019-528630, 4 pages.
Indian First Examination Report dated Nov. 13, 2020, Patent Application No. 201917027337, 6 pages.
European Communication pursuant to Article 94(3) EPC dated Nov. 18, 2020, Patent Application No. 17823321.9, 6 pages.

\* cited by examiner

US 10,887,291 B2

SECURE DATA DISTRIBUTION OF SENSITIVE DATA ACROSS CONTENT DELIVERY NETWORKS

BACKGROUND

Different networks provide varying levels of security and users may trust different networks more than other networks. Furthermore, in a large distributed computing system (e.g., multiple distributed data centers) of a computing resource service provider, various customers, users, services, and resources of the computing resource service provider are in frequent communication with each other over various networks and intermediaries. Keeping the system secure becomes more challenging as services and computing resources are added to these large distributed computing systems and as the complexity and usage of these systems increases. In such distributed computing systems, it can be difficult to identify any vulnerabilities of the system. Certain computing devices and/or computing resources may be located in different networks. Furthermore, it can also be difficult to isolate and troubleshoot issues with the system, and even when issues are identified, reliably securing the system may be challenging. In addition, various standards and regulations may require data to be secure when in transit over networks such as the Internet.

BRIEF DESCRIPTION OF THE DRAWINGS

Various techniques will be described with reference to the drawings, in which.

DETAILED DESCRIPTION

Figure 1:
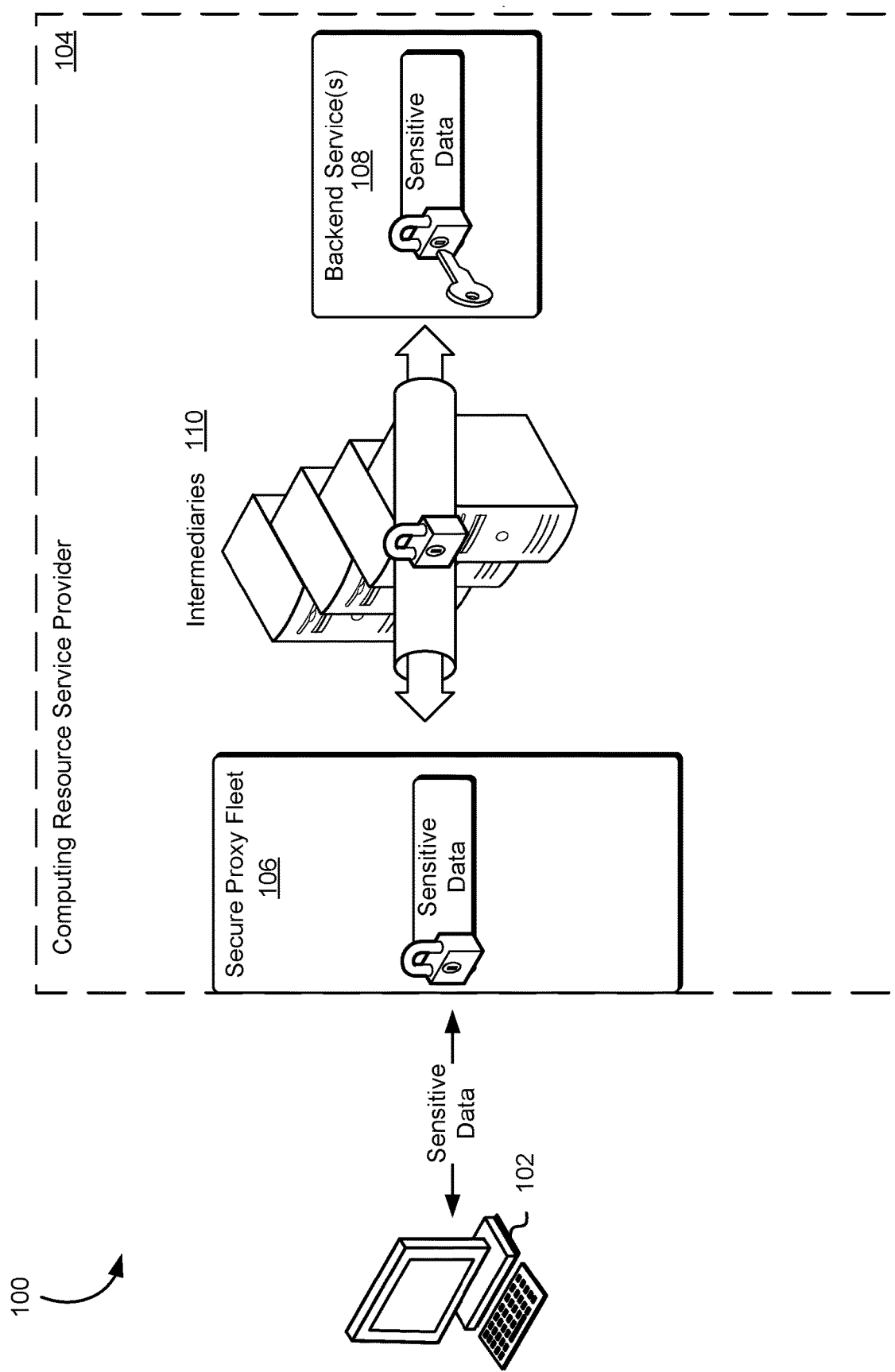
FIG. 1 illustrates an environment in which a secure proxy fleet may protect sensitive data in accordance with an embodiment.

In various examples below, techniques for protecting against unauthorized access to data are discussed. Data entering and/or traveling along various networks operated by a computing resource service provider is encrypted and secured from unauthorized access by various intermediaries along a network path to a backend service or other resting point for the sensitive data. In addition, encrypted sensitive data exiting various networks operated by the computing resource service provider may be decrypted such that the sensitive data is accessible to a client device. This sensitive data may include credit card number, e-mail address, physical addresses, passport number, telephone numbers, contacts, passwords, banking information, customer identification information, communications, or any other information a customer may consider private and/or sensitive. The computing resource service provider may provide a variety of services and/or support (e.g., by providing access to computing resources) to other entities providing services to customers.

These services may expose (e.g., make an interface available via a public communications network) various service endpoints to the customers, and the service endpoints may be connected to a public network such as the Internet. For example, a customer may interact with a retail service exposed as a website to customers. The customer interactions may include Hypertext Transfer Protocol (HTTP) requests (e.g., GET and POST requests) transmitted towards the retail service or other backend services that support the request. Furthermore, the requests may be directed towards the backend services by various proxy devices and/or proxy fleets. As described above, sensitive data is protected using various encryption techniques such as Transport Layer Security (TLS), Secure Socket Layer (SSL), and/or Hypertext Transfer Protocol Secure (HTTPS) and others, such as described below. However, the methods involve data being decrypted by the proxy devices and/or proxy fleets, for example, so that the data can be routed to the appropriate backend service and/or that sensitive data be decrypted or other modifications be made to the encrypted data stream. Therefore, to ensure that the sensitive data is not exposed as a result, the operation of the proxy devices and/or proxy fleets may be modified to improve security and efficiency as described in greater detail below.

A data protection module may be executed by the proxy devices and/or proxy fleets to provide protection of sensitive data as described in the present disclosure. The data protection module may be executed in an isolated environment or otherwise protected from access from outside of the data protection module. Configuration information may be generated based at least in part on the backend service and provided to the data protection modules executed by the proxy devices and/or proxy fleets. The configuration information may include a variety of information described in greater detail below such as cryptographic material, various definitions of sensitive data, policy information, or other information suitable for protecting sensitive data. Each data protection module may service a single backend service or a plurality of backend services. In addition, the data protection module may enforce various cryptographic algorithms described in greater detail below such as Public Key Cryptography Standards (PKCS).

The data protection module may perform different operations for data entering or exiting the computing resource service provider environment. For example, sensitive data directed towards a client device from a backend service may first be rendered or otherwise formatted for display by the client device prior to decrypting sensitive data directed towards the client device. In various embodiments, the sensitive data may include a signature or other information to be validated before the data protection module decrypts the sensitive data. As above, sensitive data may be secured outside of the computing resource service provider environment using a secure link such as TLS. Other mechanisms for protecting sensitive data are considered within the scope of the present disclosure, for example, the sensitive data may be encrypted with a public key associated with a customer prior to transmission of the sensitive data to a client device associated with the customer.

In various examples, the proxy devices and/or proxy fleets may be a part of or integrated in various content delivery networks (CDNs). These CDNs enable lower latency communication with the customers and provide efficient processing for customer requests. As described above, the data protection module may be implemented by the proxy devices and/or proxy fleets included in the CDN. In addition, the computing resource service provider or other entity may operate a key management system, described in greater detail below, to provide efficient access to cryptographic material and/or cryptographic functions. For example, when receiving sensitive data to encrypt or decrypt, the data protection module may request executing of the operation by the key management service. The key management service may be a process of the proxy devices and/or proxy fleets or may be executed on a separate computing device accessible to the data protection module.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a secure proxy fleet 106 may protect sensitive data from exposure to intermediaries with a computing resource service provider environment in accordance with an embodiment. A computing resource service provider 104 may provide customers 102 with access to various backend services 108. The backend services 108 may be operated by the computing resource service provider 104 or other entities. For example, the computing resource service provider 104 may provide an organization with access to computing resources provided by the computing resource service provider 104 to implement various services exposed to customers 102, such as a streaming media service, website, or other application. The computing resource service provider 104 may operate various networks, computing devices, services, applications, or other computing resources and provide customers 102 and other entities access to perform various operations.

As illustrated in FIG. 1, the customers 102 may send and receive sensitive data to one or more backend services 108 hosted by the computing resource service provider 104. Furthermore, the sensitive data may be exposed to one or more intermediaries 110 along a network path to the one or more backend services 108. In various embodiments, the intermediaries 110 may not be authorized to access the sensitive data. In addition, the intermediaries 110 may include any computing resource operated by the computing resource service provider 104 or other entity. For example, a particular intermediary may include a network congestion service of the computing resource service provider 104 with access to packets traveling over a network.

Customers 102 or other entities associated with sensitive data may want to read and/or write access to sensitive data restricted to trusted entities, both computing devices and persons. As described above, the computing resource service provider 104 may define and determine various requirements to maintain the security and privacy of sensitive information by regulation, legal privilege, competitiveness, contractually (e.g., pricing or other terms with vendors), or any other need to protect sensitive data. Sensitive data includes an address, passport number, a tax identifier, legal information, financial information, customer lists and/or specific customer identifying information, mergers and acquisitions, employee health records and personnel files, and customer payment instruments. Furthermore, sensitive data may include any data that may be categorized as sensitive or otherwise categorized as data to be protected. To protect sensitive data, the computing resource service provider 104 may operate a secure proxy fleet 106. The secure proxy fleet 106 may encrypt sensitive data as it comes in to the computing resource service provider environment (e.g., data centers, networks, and other computing resources operated by the computing resource service provider 104) and direct encrypted sensitive data to a single point of trust (e.g., protected resources of the one or more backend services 108) inside the computing resource service provider environment.

The sensitive data is encrypted so that access to the sensitive data may be controlled by controlling access to cryptographic material used to encrypt the sensitive data. For example, access to the sensitive data may be provided by a key management service, described in greater detail below, distributing an encryption key used to encrypt the sensitive data. The encryption may be performed using various encryption standards as described in the present disclosure such as PKCS. In addition, other safeguards may be used to secure the sensitive data. For example, a security policy or other mechanism is used to ensure that sensitive data is not stored in memory for longer than 20 seconds before the request is failed and must be retried. The secure proxy fleet 106 may be implemented using physical computing resources of the computing resource service provider 104 including networking devices and server computer systems.

The secure proxy fleet 106 may include applications or other executable code executed by the physical computing resources. As described in greater detail below, the secure proxy fleet 106 may manage and maintain cryptographic material to encrypt the sensitive data. In addition, the secure proxy fleet 106 proxy or otherwise forwards requests between the one or more backend services 108 and customers 102. For example, a particular service may expose an endpoint on a public network such as the Internet. The endpoint may allow customers 102 to communicate with the particular backend service by directing service requests to the endpoint exposed on the public network. The secure proxy fleet 106 may obtain service requests directed to the endpoint and forward the requests to the particular backend service based at least in part on information included in the service requests. For the purposes of the present disclosure, a request, service call, or other data may be directed towards a destination address (e.g., IP address, email address, SMS number, etc.) associated with the entity that the request, service call, or other data is "directed towards."

Furthermore, the secure proxy fleet 106 may operate a single proxy for each backend service and/or endpoint exposed to the customers 102. For example, a particular backend service exposes different endpoints for various types of sensitive data, such as a first endpoint for customer identifying information and a second endpoint for customer payment information. The secure proxy fleet 106 may isolate the processing of requests directed to each endpoint, for example, by physical isolation (e.g., processing separated by different physical computing hardware) or logical isolation (e.g., process isolation using sandboxing).

The backend services 108, as described above, may be provided by the computing resource service provider 104 or may be provided by one or more other entities utilizing computing resources of the computing resource service provider 104. The backend services 108 may include a number of services such as a retail service, computing instance service, on-demand storage service, block-level storage service, networking service, notification service, document management service, messaging service, or any other service implemented using computing resources of the computing resource service provider 104. For example, the backend services 108 may access the data stores illustrated in FIGS. 7 and 14 through an internal web service.

The intermediaries 110 may include any number of computing resources and/or services of the computing resource service provider 104. In addition, the intermediaries may be operated by other entities besides the computing resource service provider 104. For example, a particular intermediary may include data storage service utilizing various networks of the computing resource service provider 104 to send and receive data from customers 102. The intermediaries 110 may also enforce various security policies and/or levels of security.

Figure 2:
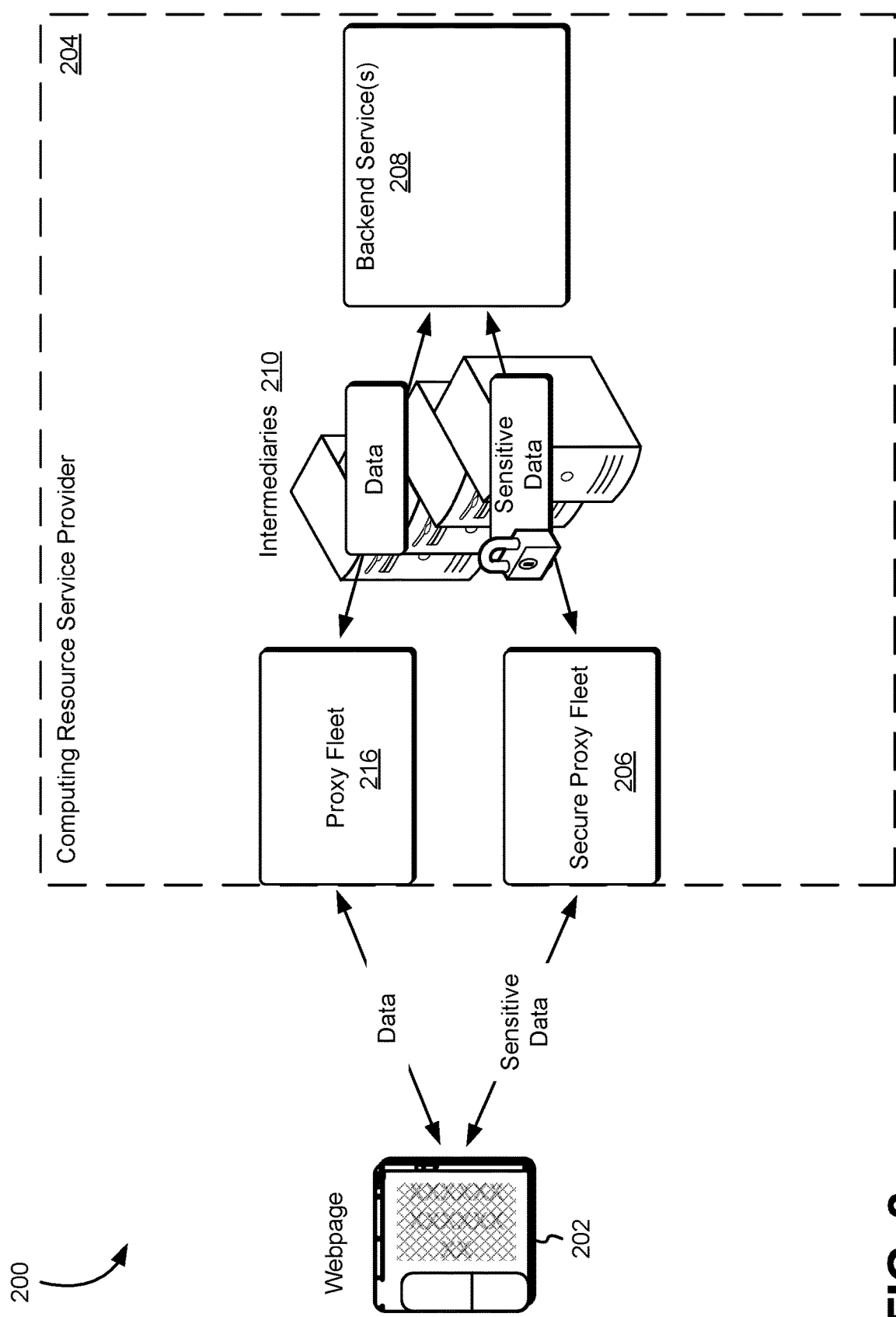
FIG. 2 illustrates an environment in which a secure proxy fleet and a proxy fleet may proxy sensitive data and data received for interactions with a website in accordance with an embodiment.

FIG. 2 illustrates an environment 200 in which a secure proxy fleet 206 and a proxy fleet may send and receive protected sensitive data to backend services 208 in accordance with an embodiment. A computing resource service provider 204 may provide customers with access to the backend services 208. The customers may access the backend services 208 through a webpage 202 or other application that communicates data to the backend services over a network, such as a stand-alone application or mobile application. The backend services 208 may be operated by the computing resource service provider 204 or other entities. For example, the computing resource service provider 204 may provide an organization with access to computing resources provided by the computing resource service provider 204 to implement various services exposed to customers, such as a streaming media service, website, or other application. The computing resource service provider 204 may operate various networks, computing devices, services, applications, or other computing resources and provide customers and other entities access to perform various operations.

As illustrated in FIG. 2, customers may send and receive sensitive data and non-sensitive data to one or more backend services 208 hosted by the computing resource service provider 204. Furthermore, the sensitive data and non-sensitive data may be exposed to one or more intermediaries 210 along a network path to the backend services 208. In various embodiments, the intermediaries 210 may not be authorized to access the sensitive data. In addition, the intermediaries 210 may include any computing resource operated by the computing resource service provider 204 or other entity. For example, a particular intermediary may include network congestion service of the computing resource service provider 204 with access to packets traveling over a network.

Returning to FIG. 2, a customer's computing device may transmit one or more HTTP requests to online proxy fleet 216 or secure proxy fleet 206 of the computing resource service provider 204. The online proxy fleet 216 and the secure proxy fleet 206 may be a collection (e.g., logical or physical grouping) of computing resources including executable instructions that, as a result of being executed by one or more processors of the computing resources, cause the computing resources to receive HTTP requests and direct those HTTP requests to one or more backend services 208 of the computing resource service provider 204. The online proxy fleet 216 and the secure proxy fleet 206 may be responsible for directing requests to the appropriate backend service 208 of the computing resource service provider 204 for processing.

The online proxy fleet 216 and the secure proxy fleet 206 may stream and/or transmit a customer's request obtained as a result of the customer interaction with the webpage 202. The online proxy fleet 216 and the secure proxy fleet 206 may be executed within the same computing resource or same process executed within the computing resource. In this manner, requests including sensitive data or non-sensitive data can be processed appropriately. For example, requests including sensitive data may be transmitted to the same proxy device (e.g., a computing device executing both the online proxy fleet 216 and the secure proxy fleet 206) as requests including other data. The traffic may be differentiated at the proxy device based at least in part on an endpoint the request is directed to. For example, the webpage 202 may be configured such that HTTP requests including sensitive data are directed to an endpoint monitored by a secure proxy fleet 206. In addition, the webpage 202 may direct HTTP requests including non-sensitive data to endpoints monitored by the online proxy fleet 216.

Figure 3:
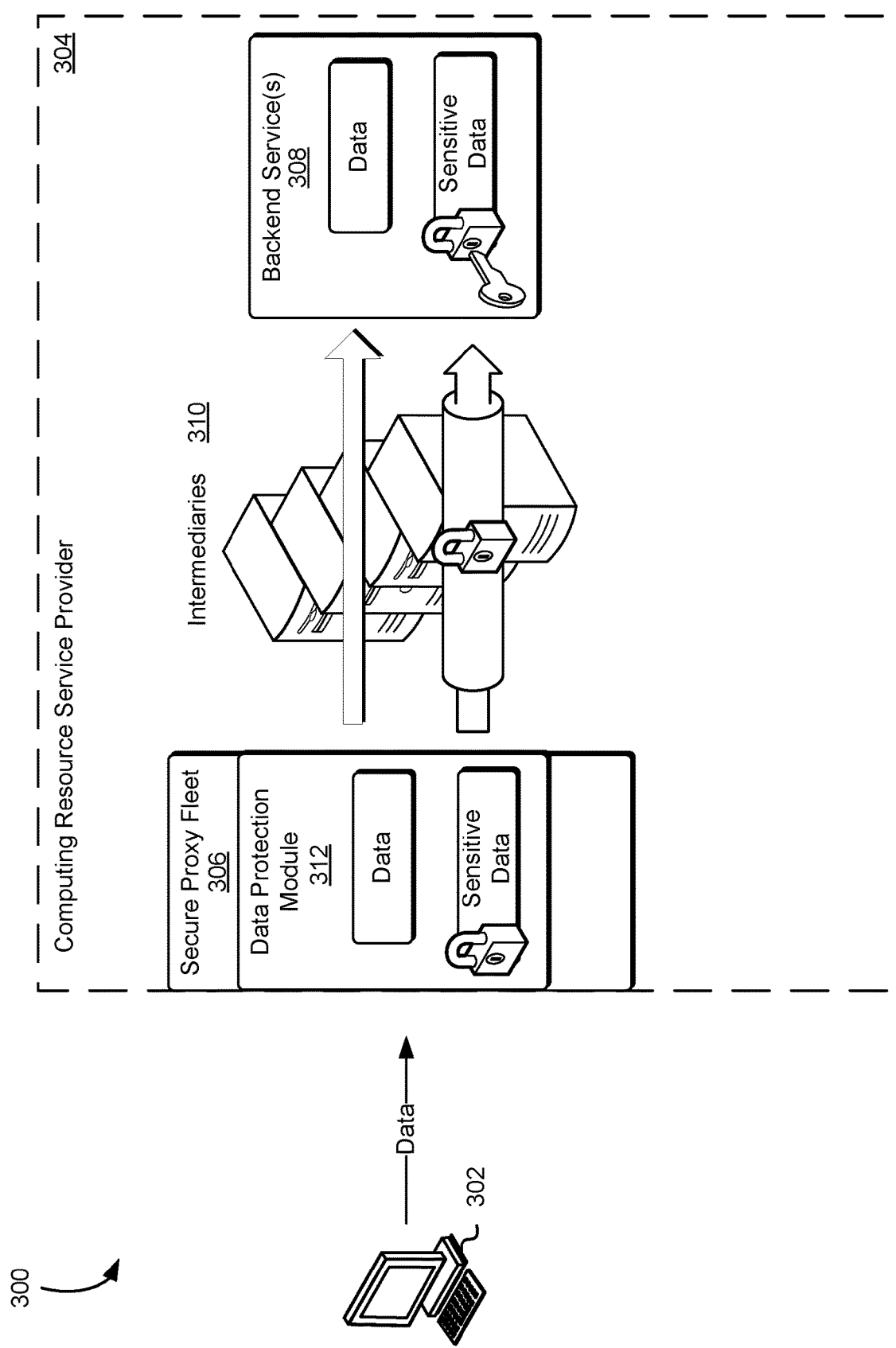
FIG. 3 illustrates an environment in which a secure proxy fleet may protect sensitive data directed towards a backend service in accordance with an embodiment.

FIG. 3 illustrates an environment 300 in which a secure proxy fleet 306 receives and protects sensitive data prior to forwarding the sensitive data to backend services 308 in accordance with an embodiment. A computing resource service provider 304 may provide customers 302 with access to the backend services 308. The customers 302 may access the backend services 308 through a webpage, service call, user interface, or application, such as a stand-alone application or mobile application that communicates data to the backend services 308 over a network. The backend services 308 may be operated by the computing resource service provider 304 or other entities. For example, the computing resource service provider 304 may provide an organization with access to computing resources provided by the computing resource service provider 304 to implement various services exposed to customers 302, such as a streaming media service, website, or other application. The computing resource service provider 304 may operate various networks, computing devices, services, applications, or other computing resources and provide customers and other entities access to perform various operations.

As illustrated in FIG. 3, the customers 302 may send sensitive data to one or more backend services 308 hosted by the computing resource service provider 304. The sensitive data may be directed to a trusted entity or location operated by the backend services 308. Furthermore, the sensitive data may be encrypted by a data protection module 312 of the secure proxy fleet 306 to prevent exposure of the sensitive data to one or more intermediaries 310 along a network path to the one or more backend services 308. In various embodiments, the intermediaries 310 may not be authorized to access the sensitive data. In addition, the intermediaries 310 may include any computing resource operated by the computing resource service provider 304 or other entity. For example, a particular intermediary may include stream service of the computing resource service provider 304 with access to computing resources of the computing resource service provider environment.

The intermediaries 310 may include any number of computing resources and/or services of the computing resource service provider 304. In addition, the intermediaries 310 may be operated by other entities besides the computing resource service provider 304. For example, a particular intermediary may include a data storage service utilizing various networks of the computing resource service provider 304 to send and receive data from customers 302. The intermediaries 310 may also enforce various security policies and/or levels of security.

As described in greater detail below, the data protection module 312 may detect sensitive data obtained from a request or data stream directed towards the backend services. In addition, the secure proxy fleet 306 and/or data protection module 312 may be a terminator for a TLS or other secure connection. In other words, the secure proxy fleet 306 and/or data protection module 312 may be responsible for establishing and maintaining one end of a secure link between the customer 302 and the backend services 308. In some examples, the secure proxy fleet 306 establishes an encrypted network connection by using a TLS connection. In other examples, the encrypted network connection is established by negotiating a symmetric key using a key exchange algorithm.

The data protection module 312 may be processes or applications executed by the same computer system executing the secure proxy fleet 306. In yet other embodiments, the secure proxy fleet 306 may be executed by dedicated hardware which also executes the data protection module 312 as a component of the secure proxy fleet 306. As described in greater detail below, the data protection module 312 may be implemented using configuration information generated by the backend services 308, computing resource service provider 304, or other entity. The configuration information may indicate to the data protection module 312 data that is sensitive, how to detect sensitive data, how to process and/or protect data that is sensitive, how to encrypt sensitive data, encryption algorithms to encrypt sensitive data, encryption keys, endpoints to transmit encrypted data to, or any other information suitable for protecting the sensitive data.

As illustrated in FIG. 3, sensitive data may be encrypted and transmitted over one or more intermediaries 310 to the backend services 308. The backend services 308 may obtain or may already contain cryptographic material required to decrypt the sensitive data. In other embodiments described below, the backend services 308 may request the cryptographic material or decryption of the cryptographic material for a key management service. In addition, the secure proxy fleet 306 may transmit data that is not sensitive to the backend service 308 in plaintext. For example, the customer may send an HTTP POST request to a particular backend service including the customer's telephone number, the secure proxy fleet 306 may encrypt the telephone number included in the HTTP POST request, such that the telephone number is undecipherable without the encryption key, but leave the remainder of the HTTP POST request in plaintext such that the request may be routed to the appropriate backend service and may be at least partially processed without requiring the entire request to be decrypted.

Figure 4:
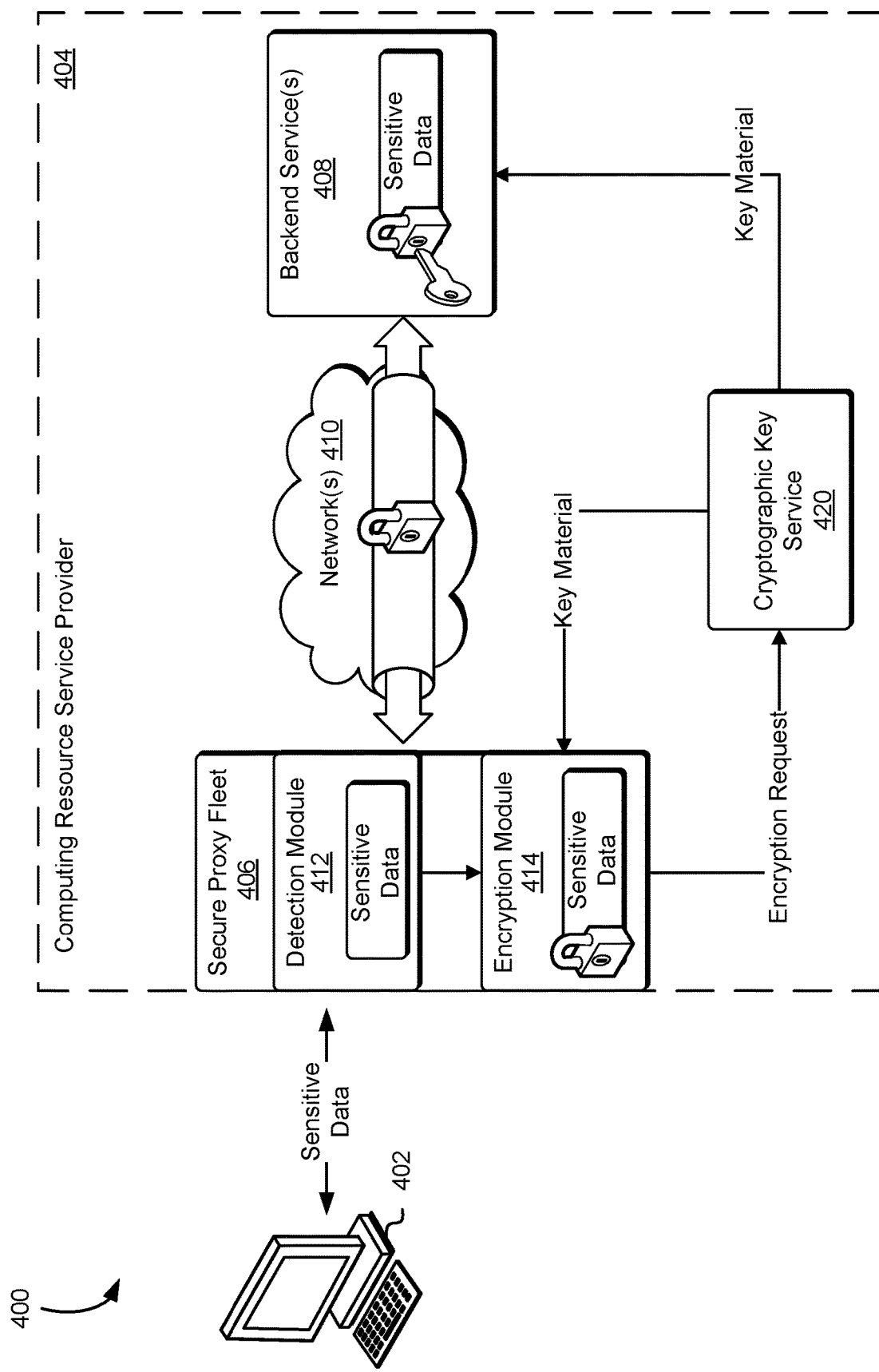
FIG. 4 illustrates an environment in which a secure proxy fleet may protect sensitive data in accordance with an embodiment.

FIG. 4 illustrates an environment 400 in which a secure proxy fleet 406 receives and protects sensitive data using a cryptographic key service 420 prior to forwarding the sensitive data to backend services 408 in accordance with an embodiment. A computing resource service provider 404 may provide customers 402 with access to the backend services 408. The customers 402 may access the backend services 408 through a webpage, service call, user interface, command line interface, or application, such as a stand-alone application or mobile application that communicates data to the backend services 408 over one or more networks 410. The backend services 408 may be operated by the computing resource service provider 404 or other entities. For example, the computing resource service provider 404 may provide an organization with access to computing resources provided by the computing resource service provider 404 to implement various services exposed to customer 402, such as an online retail service, website, or other application. The computing resource service provider 404 may operate various networks, computing devices, services, applications, or other computing resources and provide customers and other entities access to perform various operations.

As illustrated in FIG. 4, the customers 402 may send and receive sensitive data protected through the use of a cryptographic key service 420 hosted by the computing resource service provider 404 or other entity. The sensitive data may be directed to a trusted entity or location operated by the backend services 408. Furthermore, the sensitive data may be encrypted by an encryption module 414 of the secure proxy fleet 406 to prevent exposure of the sensitive data along a network path of the one or more networks 410 to the one or more backend services 408. In various embodiments, the encryption module 414 may transmit an API call to the cryptographic key service 420 to encrypt sensitive data. In one example, the encryption module 414 may request key material from the cryptographic key service 420 which is used to encrypt the sensitive data.

In addition, the key material may be encrypted by the cryptographic key service 420. In other words, the data transmitted to the cryptographic key service 420 may be reduced by simply obtaining and encrypting cryptographic keys from the cryptographic key service 420. In another example, the encryption module 414 may transmit the sensitive data in the encryption request to the cryptographic key service 420; in response, the cryptographic key service 420 returns encrypted sensitive data and, in some embodiments, the encryption key (encrypted or in plaintext) returns it to the encryption module 414.

Although the cryptographic key service 420 depicted in FIG. 4 is illustrated as a separate entity, all or a portion of the functionality of the cryptographic key service 420 may be included in the secure proxy fleet 406 and/or the backend services 408. For example, a portion of the cryptographic key service 420 may be executed as a kernel level process or micro-service by the secure proxy fleet 406. In these cases, the encryption module 414 may transmit a request to the kernel level process of the cryptographic key service 420 executed by the secure proxy fleet 406 to obtain cryptographic material. In addition, the cryptographic key service 420 may periodically or aperiodically transmit and/or update the cryptographic key material maintained by the kernel level process of the cryptographic key service 420 executed by the secure proxy fleet 406.

Returning to FIG. 4, although the one or more networks 410 are illustrated within the computing resource service provider environment, the one or more networks 410 may include a variety of different networks implemented by various entities. For example, the one or more networks 410 may include a network backbone or other network structure that is part of a publicly addressable network such as the Internet. As described in greater detail below, the networks 410 may include public networks, private networks, content delivery networks, and other networks which may be implemented by different entities and/or services and may enforce different security policies and may be accessible by different entities and/or services. In addition, various computing devices may receive requests and/or data objects including sensitive data as they are routed between the customer 402 and the backend services 408. For example, a request processing device may receive a request from the secure proxy fleet 406, including encrypted sensitive data directed to a particular backend service, and route the request to the appropriate instance of the backend service.

A detection module 412 may enable the secure proxy fleet 406 to detect sensitive data. Both the detection module 412 and the encryption module 414 may be a single process or plurality of processes, applications, or executable code that, when executed by one or more processors of the secure proxy fleet 406, causes the secure proxy fleet 406 to perform the operations described in the present disclosure. In addition, both the detection module 412 and the encryption module 414 may have configuration information pushed or otherwise provided. The configuration information may include template information generated by the backend services 408 or administrator or other entity associated with the backend services 408. The configuration information may be provided to the detection module 412 and the encryption module 414 at provisioning or instantiation of the processes executing the detection module 412 and the encryption module 414. Furthermore, the configuration information may include information suitable for identifying sensitive data, and each backend service, website, application, and/or customer may provide their own configuration information. The configuration information may indicate a data type, field, format, or flag associated with sensitive data which may be used by the detection module 412 to detect sensitive data.

Although not illustrated in FIG. 4, a TLS terminator may convert encrypted data transmitted over a cryptographically secure communication channel (e.g., HTTPS connection) to plaintext and forward or otherwise provide decrypted data to the detection module 412. In various embodiments, the detection module 412 parses received data (e.g., plaintext), and if the detection module 412 determines the received data includes sensitive data, the detection module 412 may forward or otherwise provide the data to the encryption module 414 to be encrypted. For example, the detection module 412 may receive an HTTP request from the TLS terminator and parse the HTTP request to determine whether the HTTP request includes a customer identification information field and, if so, provide a copy of the data in the customer identification information field to the encryption module.

The encryption module 414 may return the encrypted sensitive data. The encrypted sensitive data may be returned as a data object or other format described in greater detail below. In various embodiments, the detection module 412 may receive the encrypted sensitive data then replace the sensitive data with the encrypted sensitive data. Another service or process of the secure proxy fleet 406 may format or otherwise process the data received from the TLS termination prior to forwarding or otherwise provide the data, including the encrypted sensitive data, to the backend services. For example, the secure proxy fleet may modify length information included in the request as a result of replacing the plaintext sensitive data with the encrypted sensitive data.

The backend services 408 may also encrypt and protect sensitive data directed towards a client device. In such embodiments, the backend services 408 may generate a library call or API call to the cryptographic key service 420. The request to encrypt sensitive data to be transmitted to the client device may be the same as described above. The cryptographic key service 420, which may be a service of the computing resource service provider 404, manages transparent distribution of cryptographic keys (e.g., private keys) to hosts' computer systems. The backend services 408 may simply transmit an API call or other call to the cryptographic service to encrypt sensitive data and the cryptographic key service 420 may execute one or more encryption workflows and return encrypted sensitive data.

In one example, the backend services 408 may transmit a customer passport number to the cryptographic key service 420, which may be a remote or a local service (e.g., a daemon running a host computer system of the backend services 408), then the cryptographic key service 420 returns the encrypted passport number to the backend services 408. The encrypted data returned by the cryptographic key service 420 may include other information such as a time stamp or signature. The backend services 408 may then generate a response, request and/or content, including the encrypted sensitive data, to be transmitted to an endpoint such as a client device operated by the customer 402.

The encrypted sensitive data may be routed across the one or more networks 410 towards the secure proxy fleet 406 or other service or computer system for processing. For example, the backend services 408 may transmit a webpage to the customer 402, a rendering fleet may receive data including the encrypted sensitive data from the backend services 408 and convert the data into Hyper Text Markup Language (HTML) or other format. In addition, the secure proxy fleet 406 may perform additional processing of the data prior to or along with decrypting and inserting the sensitive data. As described above, the secure proxy fleet 406 may determine that the webpage directed to the customer includes sensitive data based at least in part on the presence of a flag or other marker included in the data transmitted and/or intercepted by the secure proxy fleet 406. The secure proxy fleet 406 may perform various processing operations such as unwrapping and modifying request/responses.

The cryptographic key service 420 may maintain metadata associated with cryptographic keys and may determine access rights to the cryptographic key based at least in part on a security policy and/or the metadata. In addition, particular cryptographic materials may be associated with particular data types. The cryptographic key service 420 may also maintain a local or centralized encryption key store. The key store may include asymmetric keys or symmetric keys. Furthermore, the cryptographic key service 420 may be used to provide digital envelope encryption. In addition, various methodologies for secure out-of-band transmission of the private key (for the asymmetric case) or the symmetric key (for the digital envelope encryption case) may be maintained by the cryptographic key service 420 and be subject to both periodic and aperiodic audit.

Figure 5:
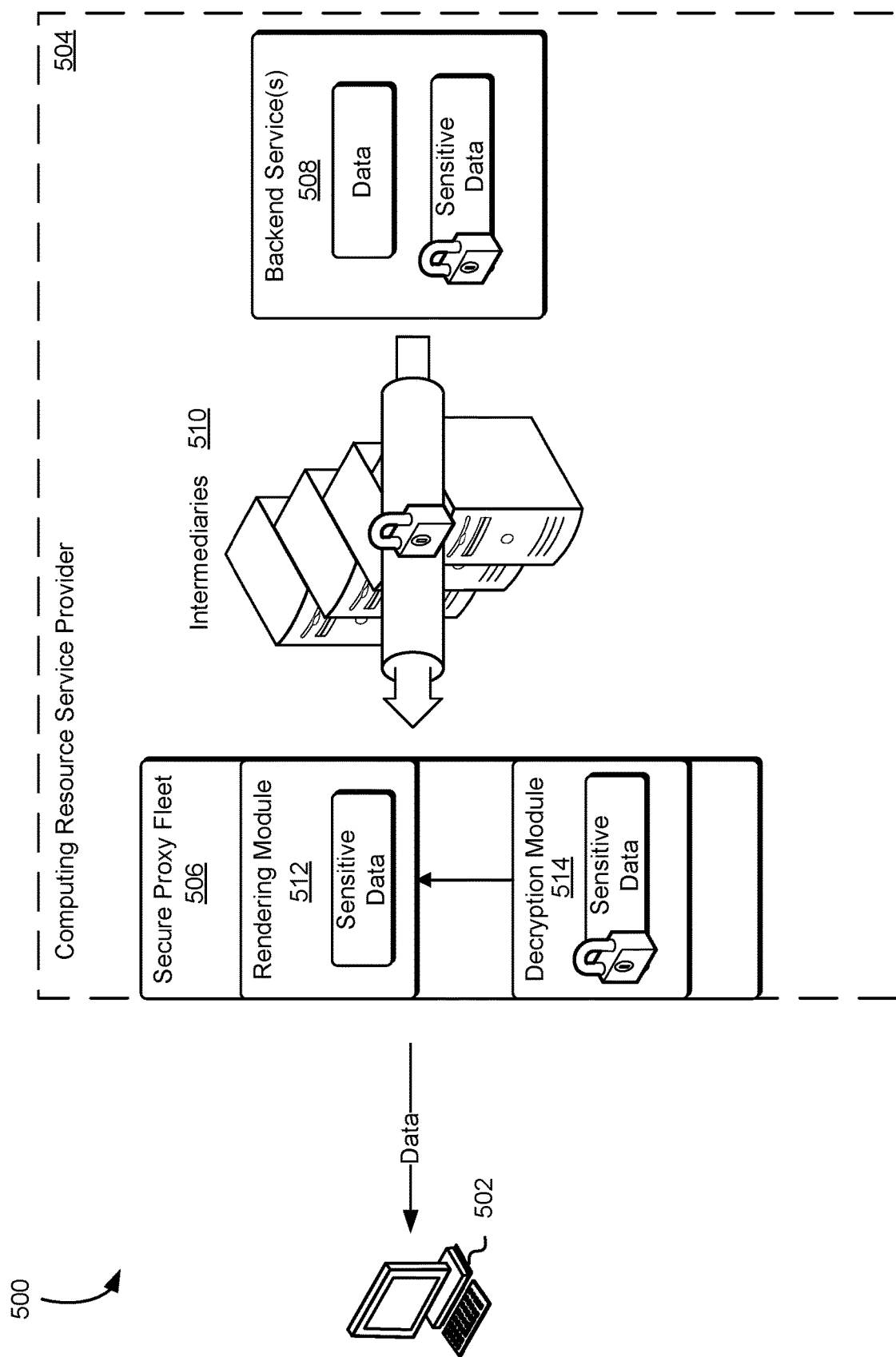
FIG. 5 illustrates an environment in which a secure proxy fleet may protect sensitive data directed towards a client device in accordance with an embodiment.

FIG. 5 illustrates an environment 500 in which a secure proxy fleet 506 receives sensitive data from one or more backend services 508 prior to forwarding the sensitive data to a customer 502 in accordance with an embodiment. A computing resource service provider 504 may provide a secure proxy fleet 506 to enable the backend services 508 to communicate with the customers 502. The backend services 508 may communicate with the customers 502 through a webpage, website, service call, user interface, command line interface, or application, such as a stand-alone application or mobile application that communicates data from the backend services 508 over one or more intermediaries 510 to the customer 502. The backend services 508 may be operated by the computing resource service provider 504 or other entities. For example, the computing resource service provider 504 may provide an organization with access to computing resources provided by the computing resource service provider 504 to implement various services exposed to customer 502, such as an online retail service, website, or other application. The computing resource service provider 504 may operate various networks, computing devices, services, applications, or other computing resources and provide customers and other entities access to perform various operations.

As illustrated in FIG. 5, the backend services 508 may direct data including sensitive data to customer 502. The sensitive data may be encrypted by the backend services 508 as described above. Furthermore, the encrypted sensitive data may be intercepted by the secure proxy fleet and processed or otherwise decrypted such that the sensitive data may be accessible to the customer 502. The secure proxy fleet 506 may include a rendering module 512 and a decryption module 514. The rendering module 512 and the decryption module 514 may be applications or processes executed by one or more processors of the secure proxy fleet 506. Furthermore, the various modules and computing resources described in the present disclosure may include physical or virtual computing resources or a combination thereof. For example, the secure proxy fleet 506 may be executed by a virtual computer system instance supported by a physical host computer system.

Returning to FIG. 5, the rendering module 512 may render data including sensitive data directed to a client device of the customer 502. For example, the data to be rendered may include a webpage containing sensitive information. The rendering module may render the webpage including encrypted sensitive information and may provide the rendered webpage to the decryption module 514 for decryption of the encrypted content. In yet other embodiments, the rendering module 512 may detect encrypted sensitive data in the rendered webpage and provide the encrypted sensitive data to the decryption module 514. The decryption module may return the plaintext of the sensitive data which may be inserted into the rendered webpage by the rendering module 512. In some embodiments, all or a portion of the webpage may be rendered prior to reaching the secure proxy fleet. For example, the one or more intermediaries 510 may include a rendering fleet which receives webpage data from the backend services 508 and generates rendered webpage content which may be forward to the secure proxy fleet. In addition, the intermediaries 510 may inject content into the data transmitted to the secure proxy fleet 506.

Although a customer 502 is illustrated in FIG. 5 as the endpoint for sensitive data from the backend services 508, the sensitive data may be distributed by the secure proxy fleet 506 to another service, for example, in a service-to-service call. In addition, the customer 502 may include various different computing devices or systems. For example, the customer 502 may include a secure storage location included in a data center operated by the customer 502. As described above the secure proxy fleet 506, rendering module 512, and the decryption module 514 may receive configuration information which may define the operation of the various components. For example, the configuration information may indicate a mechanism for enabling the rendering module to detect encrypted data. In another example, the configuration information may indicate a cryptographic algorithm or key for use by the decryption module to decrypt encrypted sensitive data.

The backend services 508 may also maintain authorized data storage described in greater detail below in connection with FIG. 7. These authorized data storage may be within the backend services 508 or may be in a remote location relative to the backend services 508 and may include a single data store or a distributed data store. The backend services 508 may maintain cryptographic keys and or credential information to access the authorized data storage. The backend services 508 may be executed using various computing devices (e.g., bare metal hypervisor, virtual machine, or a virtualization container).

The intermediaries 510 may include any number of untrusted intermediate computer systems or services that are either untrusted for the level of sensitivity of the data or have no authorized access to the sensitive information. Furthermore, the intermediaries 510 may be responsible for directing requests from the backend services 508 to the secure proxy fleet 506. For example, data transmitted by the backend services 508 may be authenticated and authorized by an intermediary and then forwarded to the secure proxy fleet 506. The secure proxy fleet 506 may determine if encrypted sensitive data is to be consumed at the destination. For example, the client device is authorized to receive the sensitive data then the secure proxy fleet may determine that the destination is able to consume the sensitive data. If the data is to be consumed by the destination (e.g., service or customer device), the sensitive data is decrypted. For example, the sensitive data may be decrypted with a private key which may be stored locally by the secure proxy fleet 506 in a secure storage location or remotely, for example, by a cryptographic key management service as described above. In various embodiments, the secure proxy fleet 506 maintains the decrypted sensitive data in memory for a short interval of time such as 5-20 seconds.

The backend services 508 may generate service calls to the secure proxy fleet 506 including service call to proxy website pages, including pagelets, widgets, and/or servlets. Each backend service may be considered a tenant of the secure proxy fleet, and have may a tenant identifier. Each tenant may have a reserved and isolated container in the secure proxy fleet 506 which may be isolated from other tenants and any other process executed by the secure proxy fleet 506 (e.g., an operating system). As described in greater detail below, a run-time with process isolation and mandatory access controls included in the operating system enforces this such process isolation. As a result, any changes to the operation of the secure proxy fleet 506 or component therefore may result in termination of the process and re-provisioning of the process with new configuration information.

Each tenant container (e.g., each isolated process associated with a tenant) may be defined by configuration information including a private key or a digital envelope symmetric key for decryption, a presentation format, address information for an exposed endpoint (e.g., publicly addressable address), or other information suitable for distributing secured sensitive data. When providing sensitive data to remote devices and systems, the secure proxy fleet 506 may establish a cryptographically protected communications channel. In some embodiments, the secure proxy fleet 506 may re-establish or re-use a TLS connection generated in response to the customer 502 submitting a request to the backend services 508. Other mechanisms may be used to secure the sensitive data once it has been decrypted by the decryption module 514 and is to be transmitted to the customer. For example, the data to be transmitted to the customer, including the decrypted sensitive data, may be encrypted with the customer's public key.

Figure 6:
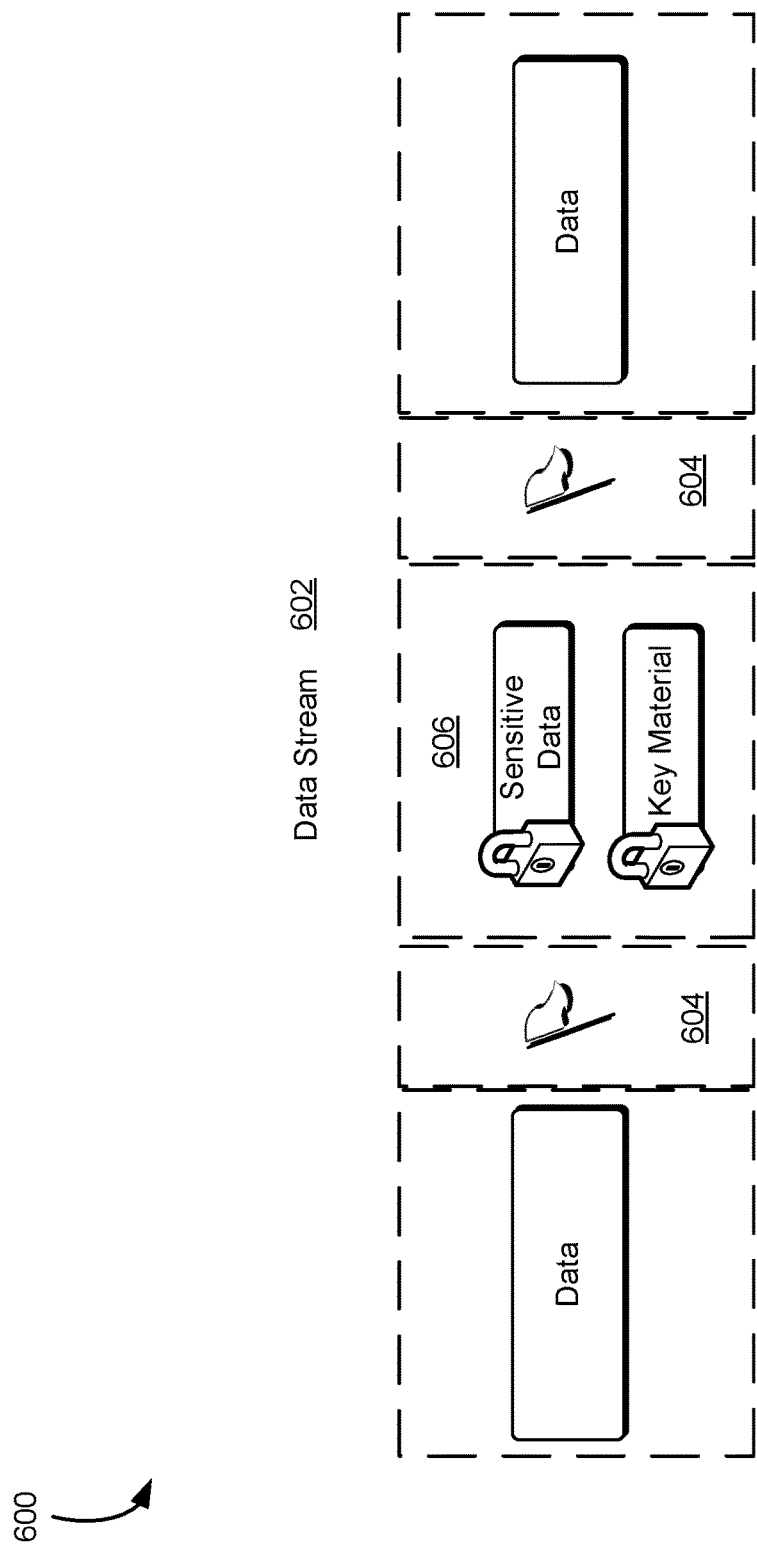
FIG. 6 is a diagram illustrating a data stream containing protected sensitive data in accordance with an embodiment.

FIG. 6 is a diagram 600 illustrating a data stream 602 in accordance with an embodiment. The data stream 602 may be received at a secure proxy fleet as described above. The data stream 602 may be obtained from a customer client device or a backend service as described above. The data stream 602 may be compressed using a variety of compression algorithms. In addition, the data stream may include an encrypted payload 606. The encrypted sensitive data of the encrypted payload 606 and the data stream 602 may be formatted by a source according to various different formatting rules. The formatting rules may be established by the computing resource service provider and may enable efficient processing of the data stream 602 and information included in the data stream 602.

For example, the backend service generates an HTTP response directed to a customer and formats the HTTP response to generate a compressed data stream and transmits the compressed data stream to the customer. As described above, the response may include encrypted sensitive data which may be encrypted in accordance with a particular format to enable the secure proxy fleet to process the request and decrypt the encrypted sensitive data. The encrypted payload 606 may have an arbitrary length and may not be known or otherwise determined prior to transmission of the encrypted payload 606 in the data stream 602.

A flag or marker 604 may be included in the data stream to indicate the presence of the encrypted payload 606. For example, in an embodiment a flag or marker 604 prior to the encrypted payload 606 indicates that data following the flag or marker 604 is sensitive data comprising the encrypted payload 606. A flag or marker 604 following the encrypted payload 606 may indicate the end of the encrypted payload 606. In an alternate embodiment, a flag or marker 604 prior to the encrypted payload 606 includes a data length of the encrypted payload 606; in this manner, the end of the encrypted payload 606 can be determined without recourse to another flag or marker 604 following the encrypted payload 606.

Other information included in the encrypted payload 606 either according to a particular formatting or based at least in part on an operation of the backend services include a service type, a website type, a timestamp, a signature, key material, routing information, an access policy, authentication information, authorization information, or any other information suitable for inclusion in the encrypted payload 606. The format of the encrypted payload may be set by the one or more backend services, the computing resource service provider, a website operator, a customer, a public standard setting committee, or any other entity.

The payload 606 and/or data stream 602 may include metadata that is undecipherable to a computing resource without authorization. In certain embodiments, the payload 606 may be undecipherable but for the metadata which may indicate a variety of information including information associated with the key material used to encrypt the payload 606, an entity responsible for encrypting the payload, audit information, authentication information, or other such information.

Figure 7:
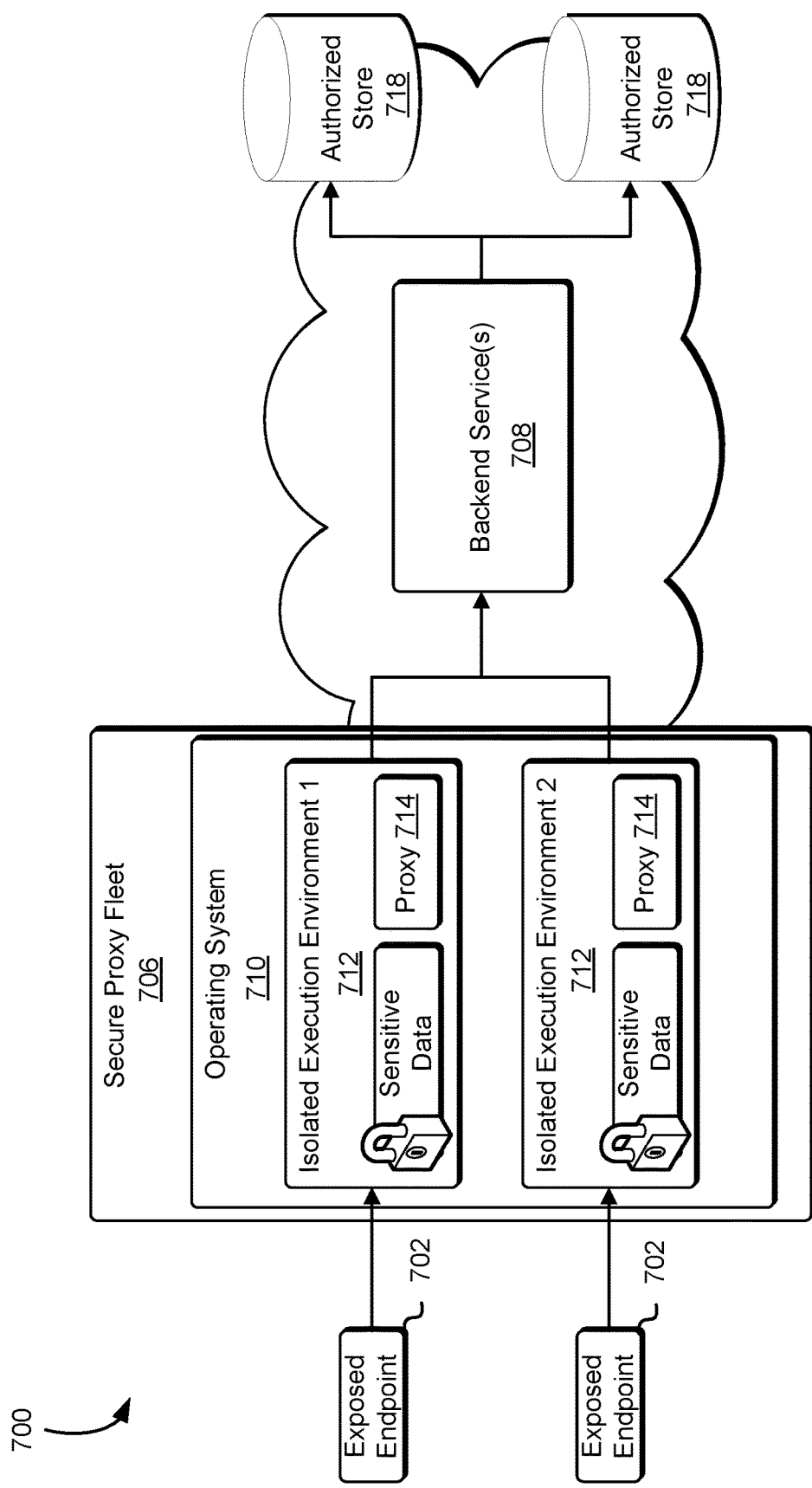
FIG. 7 illustrates an environment in which a secure proxy fleet may protect sensitive data in accordance with an embodiment.

FIG. 7 illustrates an environment 700 in which a secure proxy fleet 706 receives sensitive data from one or more exposed endpoints 702 and encrypts the sensitive data prior to transmitting the sensitive data to one or more authorized data stores 718 of one or more backend services 708 in accordance with an embodiment. A computing resource service provider, as described above, may provide a secure proxy fleet 706 to enable the backend services 708 to communicate with the customers through the exposed endpoints 702. The exposed endpoints 702 may include publicly addressable resources of a network that enable communication through a webpage, website, service call, user interface, command line interface, or application, such as a stand-alone application or mobile application. For example, the exposed endpoint 702 may include the address "secure.example.com."

The backend services 708 and the authorized data stores 718 may be operated by the computing resource service provider 704 or other entities. For example, the computing resource service provider 704 may provide an organization with access to computing resources provided by the computing resource service provider 704 to implement various services exposed to customers, such as a secure storage service. The computing resource service provider 704 may also operate various networks, computing devices, services, applications, or other computing resources and provide customers and other entities access to perform various operations. The authorized data stores 718 may include a variety of storage resources and may be implemented by one or more services such as an on-demand storage service or block-level storage service. Furthermore, authorized data stores 718 may provide a secure storage location to persist the sensitive data.

As illustrated in FIG. 7, the secure proxy fleet 706 may implement an operating system 710. In addition, the operating system 710 may provide a plurality of isolated execution environments 712. The operating system 710 may be an operating system that supports isolation and/or secure execution such as secure execution Linux®. For example, the operating system 710 includes a kernel-level application that controls processes and prevents communications and operations of unauthorized processes. These operating systems may prevent access to processes executed in the isolated execution environment 712. The secure proxy fleet may execute a TLS terminator so that HTTPS request transmitted to the exposed endpoints 702 are obtained and decrypted.

Furthermore, the secure proxy fleet 706 or other processes executed by the operating system 710 may transmit requests to the isolated execution environment 712 using a proxy 714. The operating system 710 may provide the proxy 714 so that processes may communicate with the isolated execution environment 712 in a protected manner. For example, the proxy 714 may include a UNIX® domain socket which transmits data from processes executed by the operating system 710 such as the TLS terminator in to the isolated execution environment 712. In various embodiments, the detection module, encryption module, rendering module, decryption module, or other processes described in the present disclosure are executed within the isolated execution environments 712 of the operating system 710

Returning to FIG. 7, the backend services 708 may validate that the request and/or calls made to the backend services 708 are mutually authenticated and are authorized. Each computer system calling the backend services 708 may be identified itself by name, address, type, and/or the requested payload format. When receiving sensitive data, the secure proxy fleet 706 obtains from cache or persistent storage an encryption key for the backend services 708 and constructs a payload according to a payload format. This format information may be included in the configuration information used to provision the process in the isolated execution environment. Furthermore, the configuration and/or format information may include information indicating to a header format for a destination system and other information on how to process sensitive data to be transmitted to the backend services 708. The request obtained through the exposed endpoints 702 may address the backend services 708 directly or through an API. If properly authenticated and authorized, the backend services 708 may return the data either to the requesting system in the case of a website or other service, or to a client computing service if so identified and authorized.

Figure 8:
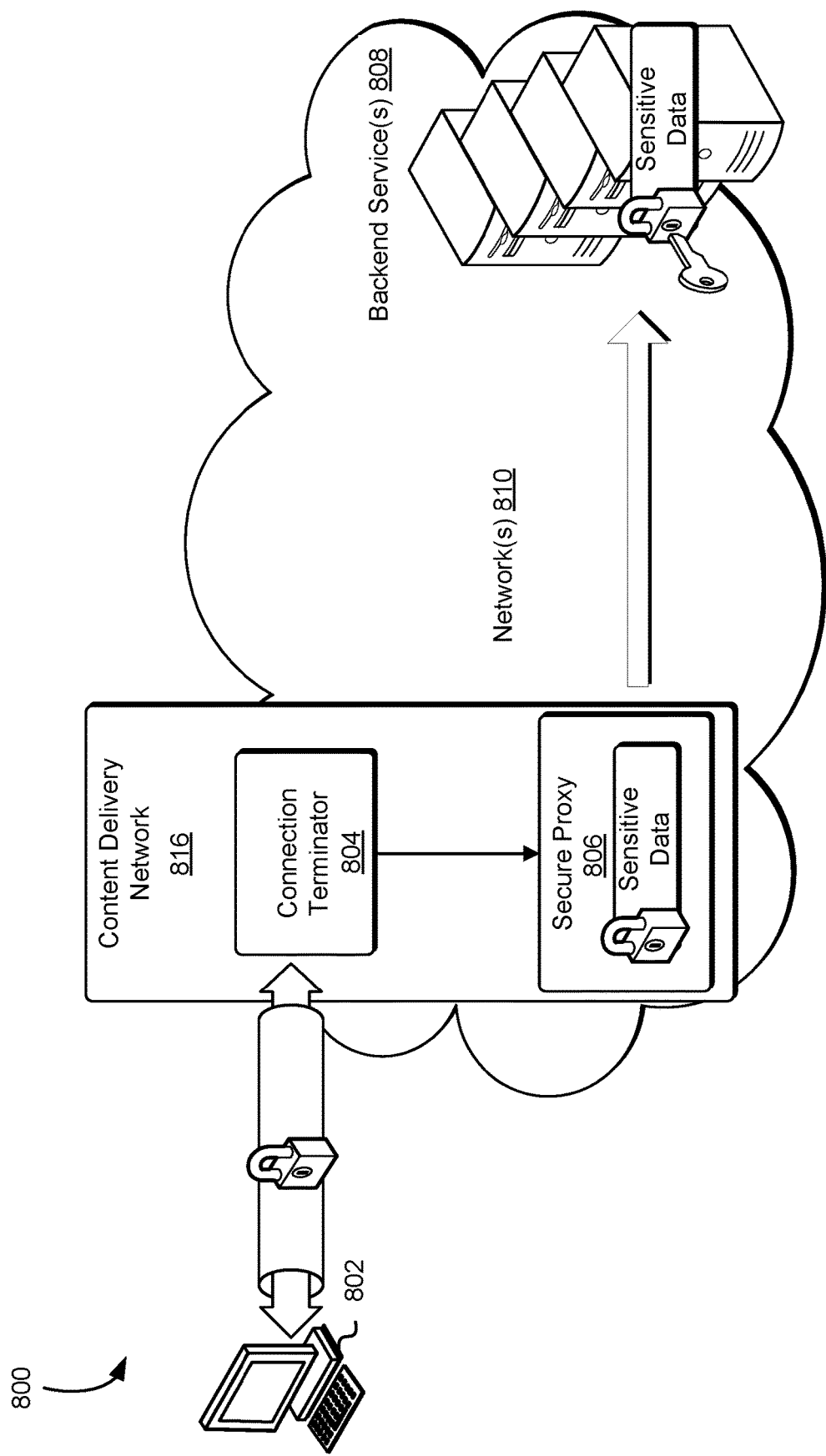
FIG. 8 illustrates an environment in which a secure proxy fleet of a content delivery network may protect sensitive data in accordance with an embodiment.

FIG. 8 illustrates an environment 800 in which a secure proxy 806 integrated with a content delivery network 816 receives sensitive data from a customer 802 and encrypts the sensitive data prior to transmitting the sensitive data to one or more backend services 808 in accordance with an embodiment. The content delivery network 816 may provide a secure proxy 806 to enable the backend services 808, implemented by a computing resource service provider as described above, to communicate with the customers 802. The backend services 808 may be operated by the computing resource service provider or other entities. For example, the computing resource service provider may provide an organization with access to computing resources provided by the computing resource service provider to implement various services exposed to customers, such as a secure streaming media service. The computing resource service provider may also operate various networks, computing devices, services, applications, or other computing resources and provide customers and other entities access to perform various operations.

As illustrated in FIG. 8, the one or more networks 810 may include a variety of different networks implemented by various entities. For example, the one or more networks 810 may include a network backbone or other network structure that is part of a publicly addressable network such as the Internet. As described in greater detail below, the networks 810 may include public networks, private networks, content delivery networks, and other networks which may be implemented by different entities and/or services and may enforce different security policies and may be accessible by different entities and/or services.

The content delivery network 816 may be used to cache and serve high velocity content to customers 802 from a network location closer in geographic proximity and/or network proximity (e.g., number of network hops) to the customers 802. The customer 802 may request content from backend services 808, which may be executed within a data center, which may maintain all of the available content. The content delivery network 816 on the other hand may store or cache a portion of the available content closer to the customer 802 to reduce latency. Latency may be measured in Round Trip Time (RTT); therefore, for requests with increased frequency, it may reduce network cost and provide a better customer experience to provide the content closer to the customer 802.

The content delivery network 816 may establish and terminate sessions using a connection terminator 804. The connections may be established from the customer 802 to a network edge device (e.g., Point-of-Presence (POP) device). In various embodiments, the content and/or request transmitted between the network edge device and the customer 802 may be transmitted over a cryptographically protected communications channel such as TLS or SSL. The network edge device and the customer 802 may be mutually authenticated. Furthermore, the connection cryptographically protected communications channel such as a TLS connection may be a long lived session.

The content delivery network 816 may be operated by an entity that is distinct from the customer 802 and the computing resource service provider. The connection terminator 804 may obtain requests from the customer 802 and decrypt the request as described above. This may expose a plain text representation of the request which may include sensitive data. The connection terminator 804 and the secure proxy 806 may be executed in an operating system that supports isolated execution environments as described above. Furthermore, the secure proxy 806 may include a data protection module as described above. In various embodiments, the connection termination 804 decrypts the request from the customer and provides the request to the secure proxy 806.

As described above, the data protection module may detect sensitive data and encrypt the sensitive data prior to transmitting the request to the backend services 808. Furthermore, the computing resource service provider or service thereof such as the cryptographic key service may provide key material to the secure proxy 806. The key material may be used to encrypt and decrypt sensitive data as described above. In addition, the key material may be sent separately from the secure proxy 806 obtaining a request from the connection terminator 804. To enable the secure proxy 806 to detect the sensitive data, the request may be in a structured format such as HTTP POST, multi-part POST, JSON, XML, or other format including a token or field that can be detected and indicate an owner. The data protection module can encrypt or decrypted based at least in part on information indicating the owner of the data. For example, encrypting the data with the public key of the data or encrypting a symmetric key used to encrypt the data with the owner's private key and sending the encrypted symmetric key to the owner.

The content delivery network 816 may include one or more racks of servers executing an operating system with a run-time with process isolation and mandatory access controls to enforce security and protection of the sensitive data. In yet other embodiments, the content delivery network 816 may be executed by virtual hosts executing in a content delivery network environment, where each bare metal server is dedicated only to a single entity. In addition, with sufficient isolation at the hardware layer (e.g., dedicated racks and/or dedicated hosts), secure proxy 806 may be executed in a container instance.

Figure 9:
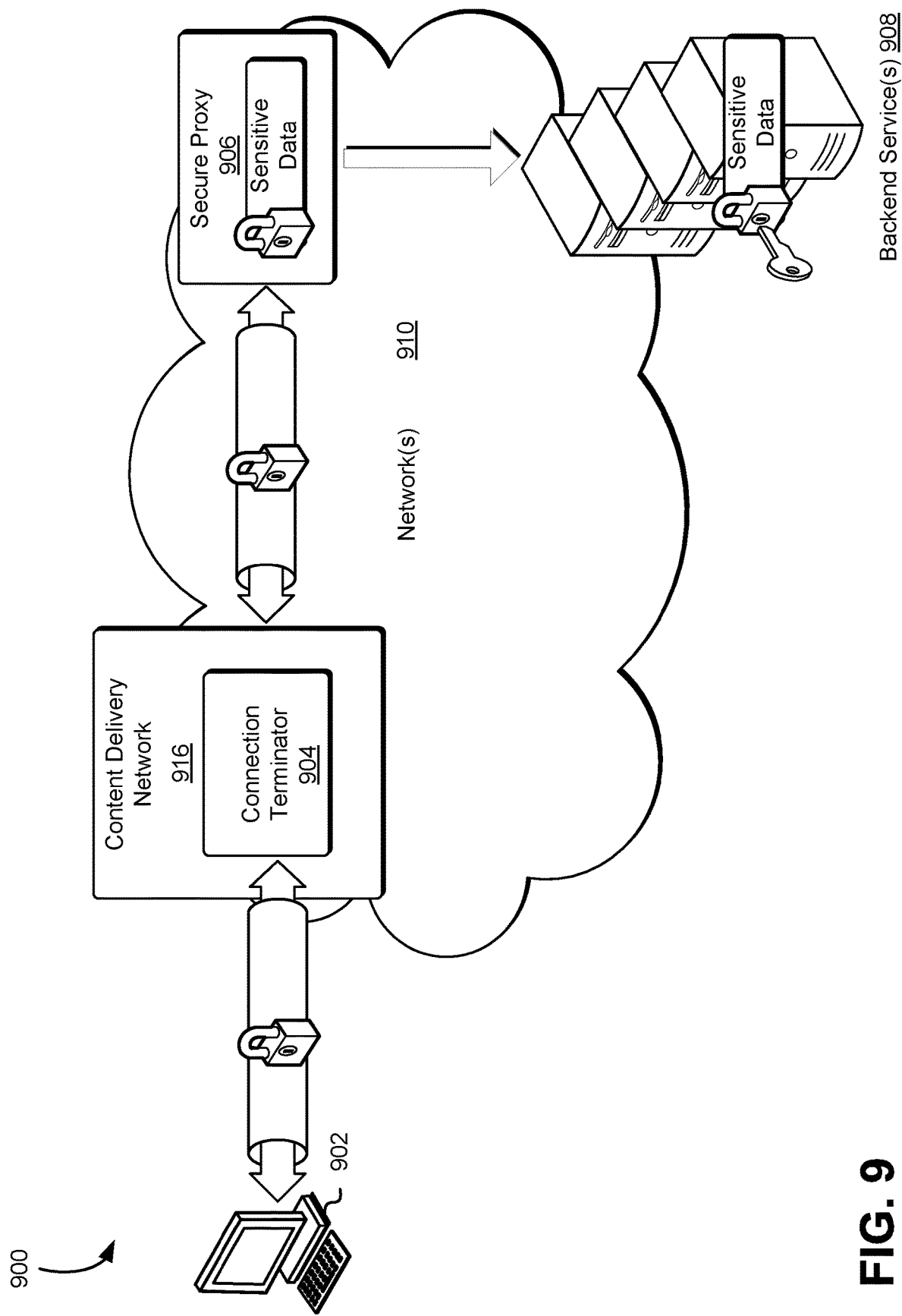
FIG. 9 illustrates an environment in which a secure proxy fleet of a content delivery network may protect sensitive data in accordance with an embodiment.

FIG. 9 illustrates an environment 900 in which a secure proxy 906 connected with a content delivery network 916 receives sensitive data from a customer 902 and encrypts the sensitive data prior to transmitting the sensitive data to one or more back end services 908 in accordance with an embodiment. The content delivery network 916 establishes a connection with the secure proxy 906 to enable the backend services 908, implemented by a computing resource service provider as described above, to communicate with the customers 902. The backend services 908 may be operated by the computing resource service provider or other entities. For example, the computing resource service provider may provide an organization with access to computing resources provided by the computing resource service provider to implement various services exposed to customers, such as a secure streaming media service. The computing resource service provider may also operate various networks, computing devices, services, applications, or other computing resources and provide customers and other entities access to perform various operations.

As illustrated in FIG. 9, the one or more networks 910 may include a variety of different networks implemented by various entities. For example, the one or more networks 910 may include a network backbone or other network structure that is part of a publicly addressable network such as the Internet. As described in greater detail below, the networks 910 may include public networks, private networks, content delivery networks, and other networks which may be implemented by different entities and/or services and may enforce different security policies and may be accessible by different entities and/or services.

The content delivery network 916 may be used to cache and serve high velocity content to customers 902 from a network location closer in geographic proximity and/or network proximity (e.g., number of network hops) to the customers 902. The customer 902 may request content from backend services 908, which may be executed within a data center, which may maintain all of the available content. The content delivery network 916 on the other hand may store or cache a portion of the available content closer to the customer 902 to reduce latency. Latency may be measured in Round Trip Time (RTT); therefore, for requests with increased frequency, it may reduce network cost and provide a better customer experience to provide the content closer to the customer 902.

The content delivery network 916 may establish and terminate sessions using a connection terminator 904. The connections may be established from the customer 902 to a network edge device (e.g., Point-of-Presence (POP) device). In various embodiments, the content and/or request transmitted between the network edge device and the customer 902 may be transmitted over a cryptographically protected communications channel such as TLS or SSL. The network edge device and the customer 902 may be mutually authenticated. Furthermore, the connection cryptographically protected communications channel such as a TLS connection may be a long lived session. As illustrated in FIG. 9, the connection terminator 904 may also establish a connection with the secure proxy 906. The secure proxy 906 may be executed by the computing resource service provider and may be connected to a network distinct from the content delivery network 916.

The content delivery network 916 may be operated by an entity that is distinct from the customer 902 and the computing resource service provider. The connection terminator 904 may obtain requests from the customer 902 and decrypt the request as described above. This may expose a plain text representation of the request which may include sensitive data. The connection terminator 904 may then encrypt the request and transmit the request over a cryptographically protected communications channel to the secure proxy 906. For example, the connection terminator 904 may establish a long lived TLS connection with the secure proxy 906. This may reduce the need to re-negotiate key material when transmitting data between the connection terminator 904 and the secure proxy 906. In such embodiments, the secure proxy may execute its own TLS terminator not shown in FIG. 9 for simplicity. Furthermore, the secure proxy 906 may include a data protection module as described above. In various embodiments, the connection terminator 904 decrypts the request from the customer and provides the request to the secure proxy 906.

As described above, the data protection module may detect sensitive data and encrypt the sensitive data prior to transmitting the request to the backend services 908. Furthermore, the computing resource service provider or service thereof such as the cryptographic key service may provide key material to the secure proxy 906. The key material may be used to encrypt and decrypt sensitive data as described above. In addition, the key material may be sent separately from the secure proxy 906 obtaining a request from the connection terminator 904. To enable the secure proxy 906 to detect the sensitive data, the request may be in a structured format such as HTTP POST, multi-part POST, JSON, XML, or other format including a token or field that can be detected and indicate an owner. Then the data protection module can encrypt or be decrypted based at least in part on information indicating the owner of the data. For example, encrypting the data with the public key of the data or encrypting a symmetric key used to encrypt the data with the owner's private key and sending the encrypted symmetric key to the owner.

In the environment illustrated in FIG. 9, the process for securing sensitive data may be the same as described above with the addition of an added network hop between the content delivery network 916 and the secure proxy 906. In some embodiments, the content delivery network includes a secure proxy 906 as described above in connection with FIG. 8. In these embodiments, for a given request, the content delivery network or process thereof may determine whether to process the request at the secure proxy executed within the content delivery network 916 or forward the request for processing to the secure proxy 906 executed by the computing resource service provider.

For example, if the content delivery network 916 encrypts the sensitive data, the content delivery network 916 can add a flag notifying downstream data protection modules that the sensitive data is protected and the data can be ignored. The content delivery network 916 may determine to encrypt the sensitive data in situations where exposure is unacceptable. In another example, the content delivery network 916 may determine to encrypt the sensitive data based on the data type associated with the sensitive data. Therefore, for data indicated as a less sensitive data type, the content delivery network 916 may forward the request including the sensitive data to the secure proxy 906 for protection. Encryption of the sensitive data by the content delivery network 916 may be performed using any of the mechanisms described above.

In addition, the content delivery network 916 may also be used to provide data to the customer 902. When providing encrypted sensitive data to the customer, the content delivery network 916 may parse requests, decrypt sensitive data, and replace encrypted sensitive data with decrypted sensitive data as described above. However, in the case of the content delivery network 916 the data may be included in an unstructured format or stream of data. A flag or other marker included in the data may be used to indicate sensitive data, whether to decrypt the sensitive data, whether to ignore the sensitive data, whether to decrypt the sensitive data at the content delivery network 916 or inside the computing resource service provider environment, or any other indication of how to process the sensitive data.

Figure 10:
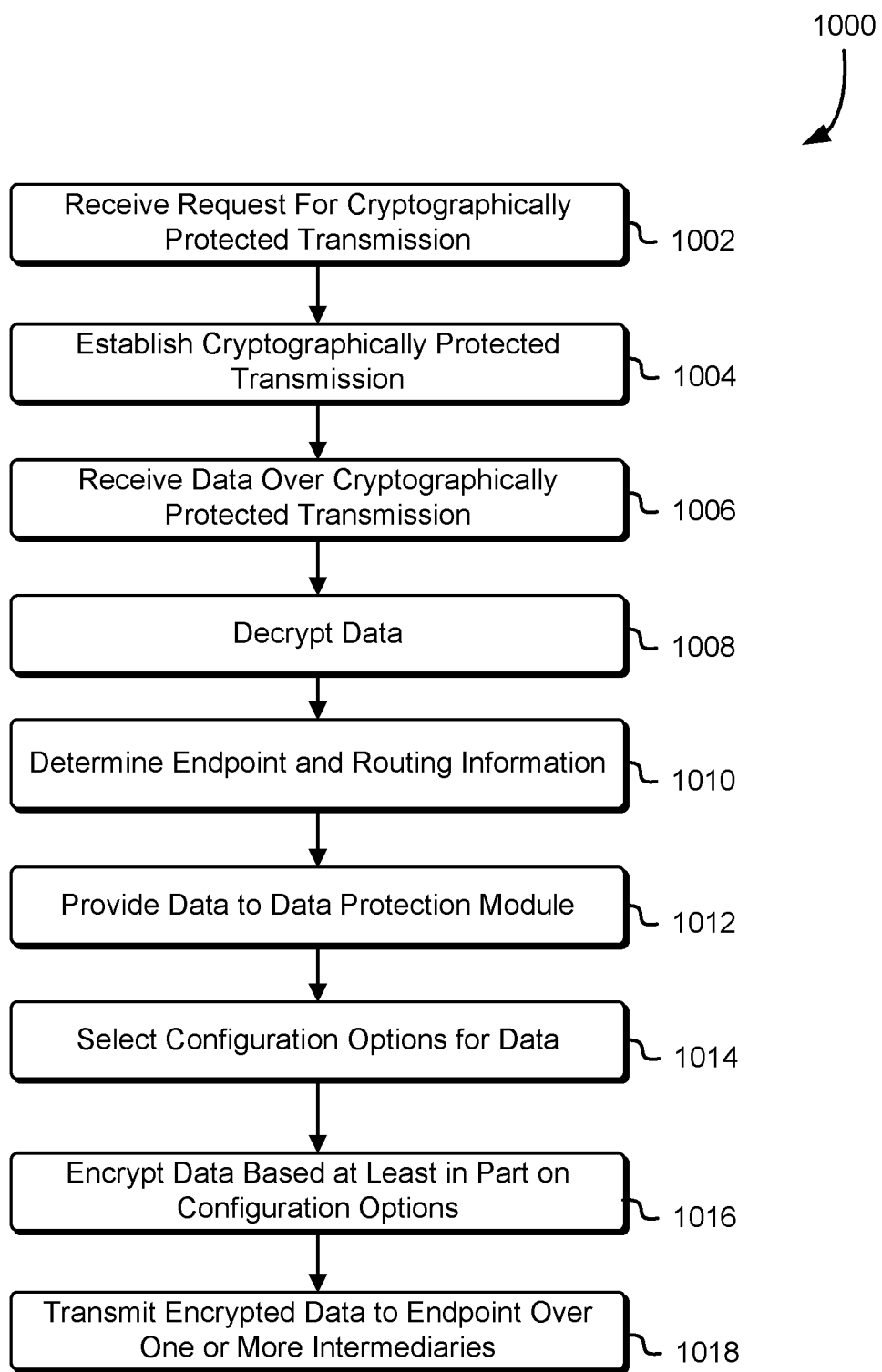
FIG. 10 is a block diagram that illustrates an example of a secure proxy fleet protecting sensitive data directed towards a backend service in accordance with an embodiment.

FIG. 10 is a block diagram illustrating an example of a process 1000 for protecting sensitive data directed to a backend service in accordance with an embodiment. The process 1000 may be performed by any suitable system such as a secure proxy fleet described above in connection with FIG. 3. Some or all of the process 1000 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 1000 includes receiving a request for a cryptographically protected transmission 1002. The cryptographically protected transmission may include various methods of encrypting data to transmit the data over an unsecured network such as TLS or SSL. In addition, the request may be generated by an application executed by a client device in response to a customer interaction with the application. For example, the customer may use a web browser to navigate to a particular webpage. The request may be received at a secure proxy fleet or component thereof such as a connection terminator as described above. The secure proxy fleet or connection terminator may then establish the cryptographically protected transmission 1004. The cryptographically protected transmission may be established based at least in part on a protocol of the algorithm as described above.

Once the cryptographically protected transmission is established, the secure proxy fleet may receive data over the cryptographically protected transmission 1006. The data may include requests, service calls, formatted and unformatted data (e.g., a data stream), or any other information that may be submitted by a customer to a backend service. The connection terminator may then decrypt the data 1008. For example, if the data includes an HTTPS request, the connection terminator may decrypt the encrypted data and generate an HTTP request. The secure proxy fleet or component thereof, such as a routing component, may then determine, based at least in part on the decrypted data, endpoint and routing information 1010. The endpoint and routing information may indicate a particular backend service and network path to direct the data. In addition, this information may be used to determine a particular data protection module of the secure proxy fleet to process data. As described above, the secure proxy fleet and/or data protection module may be configured for a single tenant (e.g., single backend service or exposed endpoint of a backend service) and as such may only process requests directed to the single tenant.

Returning to FIG. 10, the system executing the process 1000 may then provide the data to the data protection module 1012. The decrypted data may be streamed over a secure channel or otherwise provided to the data protection module. For example, the secure proxy fleet may provide the decrypted data to the data protection module over a UNIX® domain socket. The data protection module may receive the data and select configuration options for the data 1014. The configuration options may be selected based at least in part on the configuration information described above. For example, the data protection module may select a format for the data, such as a request format, and an encryption key to use to encrypt sensitive data.

The data protection module may then encrypt data based at least in part on the configuration operations 1016. The data protection module may only encrypt sensitive data indicated by the configuration options. As described above, the data protection module may use a cryptographic key service to perform various operations of the encryption workflow. The secure proxy fleet may then transmit the encrypted data to the endpoint over one or more intermediaries 1018. The intermediaries may include various networks and computer systems as described above. Furthermore, the encrypted data may be inserted into a request to the backend service and transmitted to an endpoint associated with the backend service.

Note that one or more of the operations performed in 1002-1018 may be performed in various orders and combinations, including in parallel. For example, in some embodiments the operations 1002-1008 may be omitted and the secure proxy may simply receive plaintext data from a client device. Furthermore, in some implementations the secure proxy fleet may maintain a plurality of data protection modules and/or multiple proxies; in such cases, multiple instances of the process 1000 may be executing in parallel at the secure proxy fleet.

Figure 11:
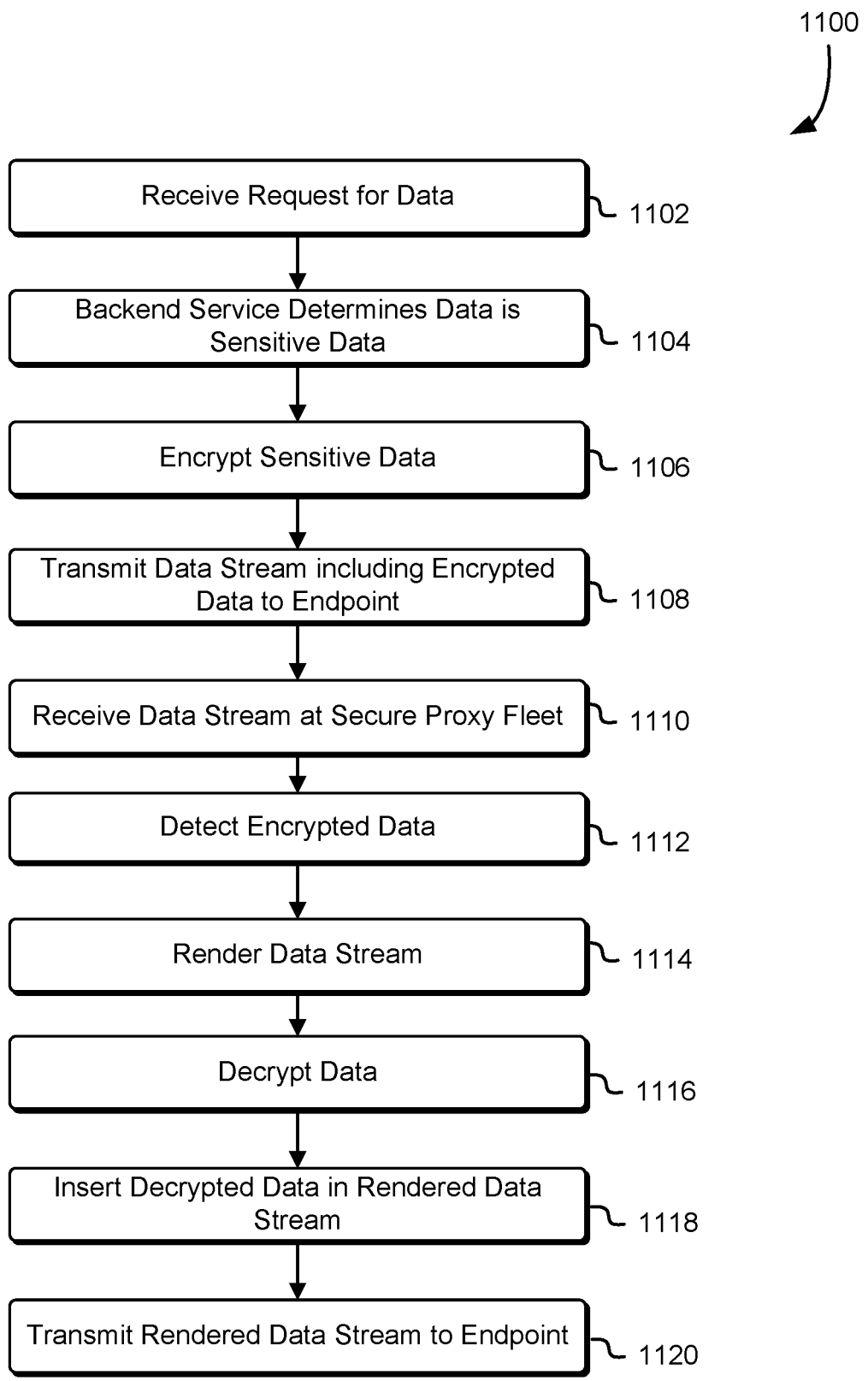
FIG. 11 is a block diagram that illustrates an example of a secure proxy fleet protecting sensitive data directed towards a client device in accordance with an embodiment.

FIG. 11 is a block diagram illustrating an example of a process 1100 for protecting sensitive data directed from a backend service to a client device in accordance with an embodiment. The process 1100 may be performed by any suitable system such as a secure proxy fleet described above in connection with FIG. 5. Some or all of the process 1100 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 1100 includes, receiving a request for data 1102. The requests may be received from a client device operated by a customer, another service of a computing resource service provider, or third party. For example, the customer may request access to a first service, which may in turn request sensitive data from the backend service to include in a response by the first service to the customer. The backend service may then determine the data is sensitive data 1104. The backend service may determine the data is sensitive based at least in part on a category or type associated with the data. As a result, the backend service may encrypt the sensitive data 1106. Any number of encryption algorithms and standards may be used to protect the sensitive data as described above. For example, the backend service may use digital envelope encryption to protect a cryptographic key used to encrypt the sensitive data.

The backend service may then transmit a data stream including the encrypted data to an endpoint 1108. The data stream may be directed, redirected, and/or intercepted by the secure proxy fleet. In addition, the one or more intermediaries as described above may obtain and modify the data stream. For example, a rendering fleet may obtain the data stream and generate HTML based at least in part on the data included in the data stream. The secure proxy fleet may then receive the data stream 1110. The secure proxy fleet may be integrated with a content delivery network or may be executed using computing resources of the computing resource service provider.

The secure proxy fleet may then detect encrypted data 1112. The encrypted data may be detected based at least in part on a flag or marker included in the data stream as described above. The secure proxy fleet or component thereof, such as a rendering module, may then render the data stream 1114. Rendering the data stream may include any number of operations to process and organize the data for consumption by the client device. For example, rendering the data may include removing any executable code from the data. The secure proxy fleet or component thereof, such as a decryption module, may then decrypt the data 116. The data may be decrypted using an encryption key which may be stored in memory of the secure proxy fleet or obtained from a cryptographic key service as described above.

The secure proxy fleet may then insert the decrypted data into a rendered data stream 1118. The rendered data stream may include data organized for consumption by a particular client device and directed to the particular client device. For example, the rendered data stream may include webpage content requests by the customer. Inserting the decrypted data may include overwriting the encrypted data with the decrypted data in the rendered data stream. The secure proxy fleet may then transmit the rendered data stream to the endpoint 1120. For example, the secure proxy fleet may transmit the rendered data fleet to the customer over the Internet using an IP address associated with the customer.

Note that one or more of the operations performed in 1102-1120 may be performed in various orders and combinations, including in parallel. For example, in some embodiments the operations 1102-1108 may be omitted and the secure proxy may simply receive encrypted data. Furthermore, in some implementations the secure proxy fleet may maintain a plurality of data protection modules and/or multiple proxies; in such cases, multiple instances of the process 1000 may be executing in parallel at the secure proxy fleet.

Figure 12:
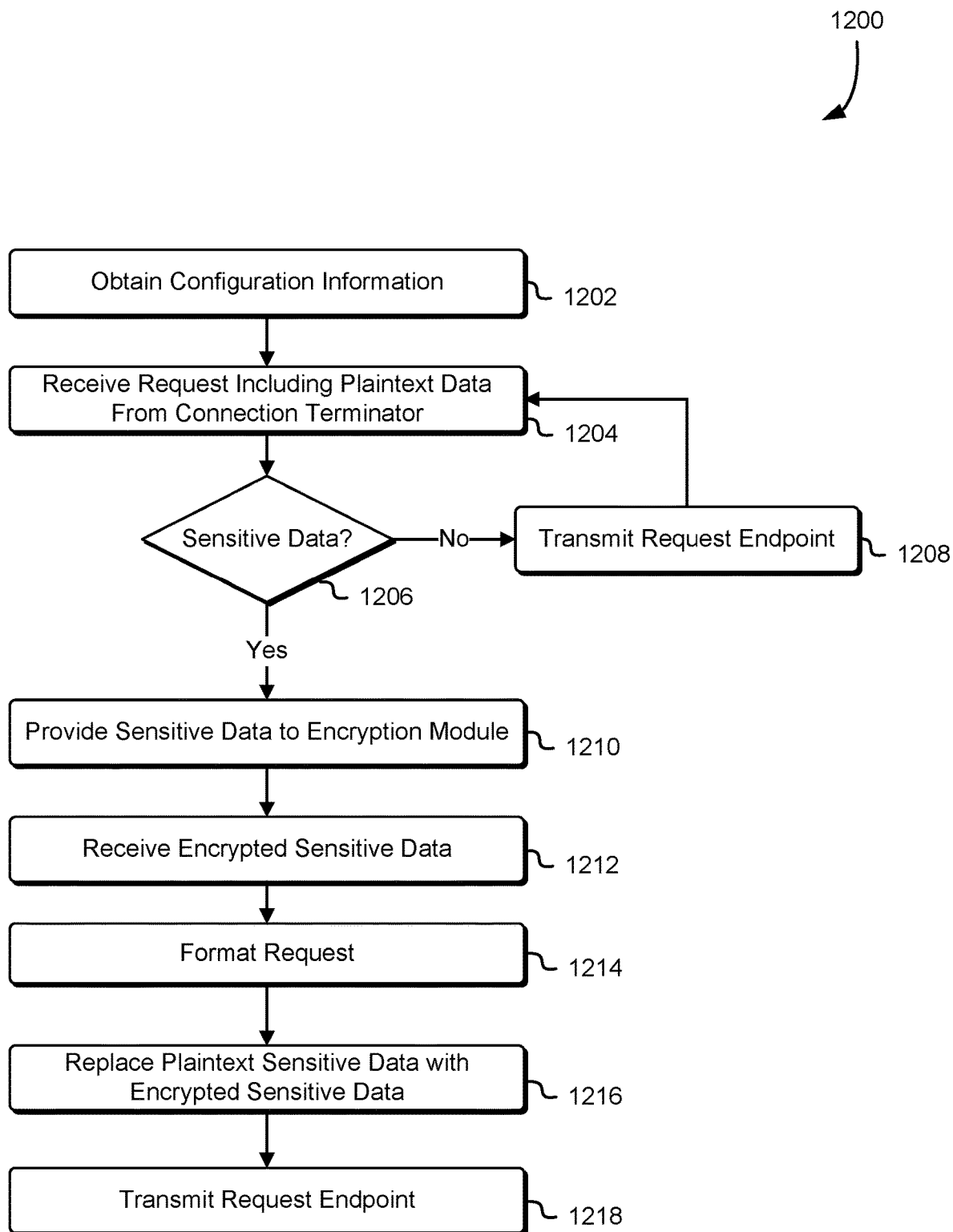
FIG. 12 is a block diagram that illustrates an example of a secure proxy fleet protecting sensitive data using data encrypting in accordance with an embodiment.

FIG. 12 is a block diagram illustrating an example of a process 1200 for protecting sensitive data by a data protection module in accordance with an embodiment. The process 1200 may be performed by any suitable system such as a data protection module described above in connection with FIG. 3. Some or all of the process 1200 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 1200 includes obtaining configuration information 1202. The configuration information may be obtained from a backend service as described above and may contain information suitable for protecting sensitive data and communication with the backend service. For example, the configuration information may include a public key of the backend service and a request format associated with the backend service. The data protection module may then receive a request including plaintext data from a connection terminator 1204. The request may be forwarded or otherwise provided from a secure proxy fleet or edge network device as described above. The request may include any number of requests including and HTTP request or service request.

The data protection module may then determine if the request includes sensitive data 1206. The data protection module may detect sensitive data based at least in part on the configuration information and may be indicated by a flag or data type as described above. If the request does not include sensitive data the data protection module or secure proxy fleet may transmit the request to the endpoint 1208. However, if the data protection module detects sensitive data, the data protection module may provide the sensitive data to an encryption module 1210. The encryption module may be a separate process executed by the secure proxy fleet as described above. The encryption module may also interact with a cryptographic key service to encrypt the sensitive data.

The data protection module may then receive encrypted sensitive data from the encryption module 1212. The data protection module may then format a request to the backend service 1214. The request may be formatted based at least in part on the configuration information. Once the request is formatted the data protection module may replace the plaintext sensitive data with the encrypted sensitive data 1216. This may result in a modified request. The data protection module may then transmit the request to an endpoint associated with the backend service 1218.

Note that one or more of the operations performed in 1202-1218 may be performed in various orders and combinations, including in parallel. For example, in some embodiments the operations 1202-1206 may be omitted and the data protection module may simply encrypt all the data provided to the data protection module. Furthermore, in some implementations the secure proxy fleet may maintain data protection modules and/or multiple proxies; in such cases, multiple instances of the process 1200 may be executing in parallel at the secure proxy fleet.

Figure 13:
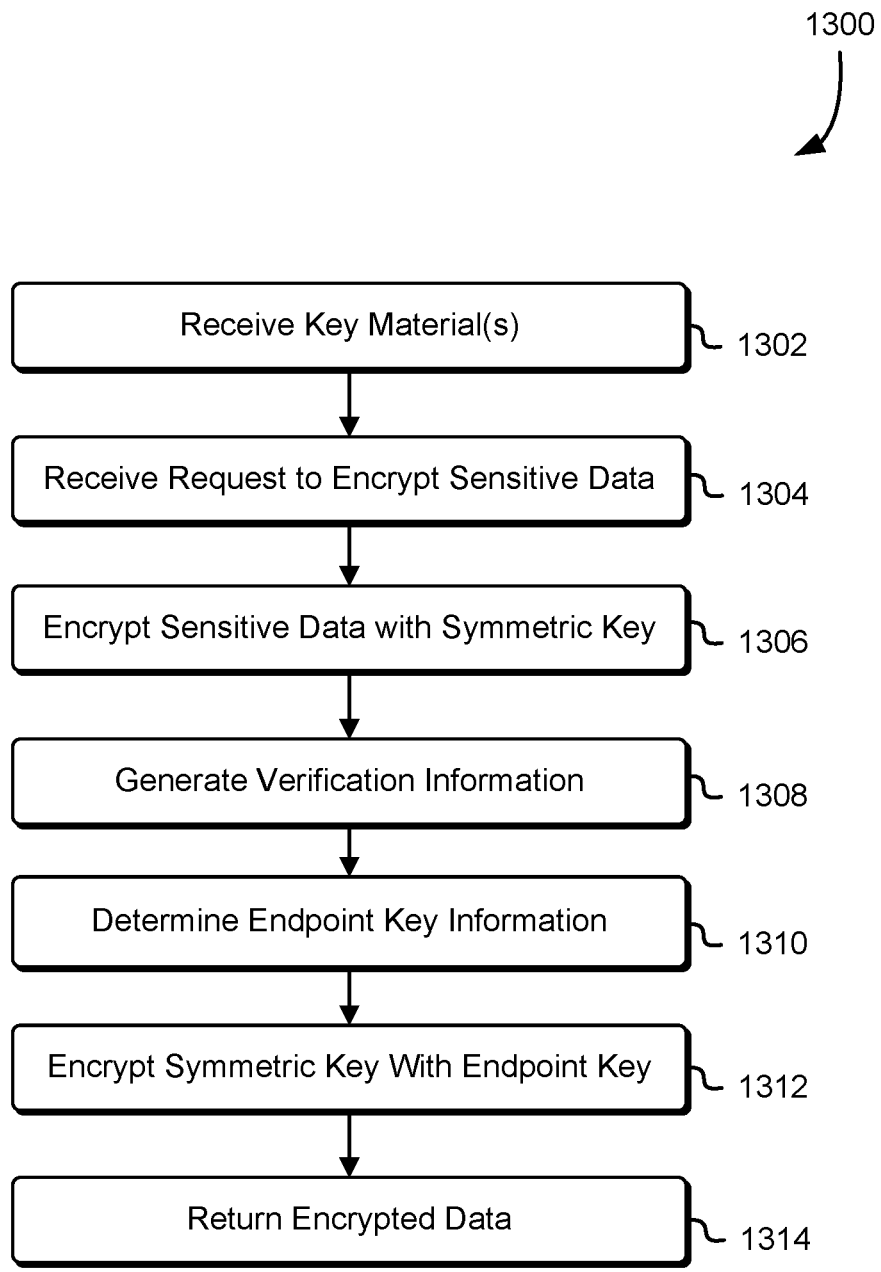
FIG. 13 is a block diagram that illustrates an example of cryptographic material used by a secure proxy fleet to protect sensitive data in accordance with an embodiment.

FIG. 13 is a block diagram illustrating an example of a process 1300 for performing key management for a secure proxy fleet in accordance with an embodiment. The process 1000 may be performed by any suitable system such as cryptographic key management service described above in connection with FIG. 4. Some or all of the process 1300 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 1300 includes receiving key materials 1302. As described above, the cryptographic key management service may execute a kernel level application on the secure proxy fleet which may periodically or aperiodically receive key materials. The cryptographic key management service may then receive a request to encrypt sensitive data 1304. The request may be obtained from a data protection module or encryption module as described above. The cryptographic key management service may then encrypt the sensitive data with a symmetric key 1306. The symmetric key may be generated by the system executing the process 1300 or may be obtained from the key materials.

Furthermore, the cryptographic key management service may generate verification information 1308. The verification information may include a timestamp or signature as described above. The cryptographic key management service may then determine endpoint key information 1310. The endpoint key information may include metadata or other information indicating a particular cryptographic key associated with the endpoint such as a public key. The cryptographic key management service may then encrypt the symmetric key with the endpoint key 1312. For example, the cryptographic key management service may encrypt the symmetric key with a key only accessible to the endpoint.

The cryptographic key management service may then return the encrypted data 1314. The encrypted data may be returned to the data protection module or other component of the secure proxy fleet. In addition, the encrypted data may include the encrypted sensitive data, the encrypted symmetric key, and the verification information. Note that one or more of the operations performed in 1302-1314 may be performed in various orders and combinations, including in parallel. For example, in some embodiments the operation 1308 may be omitted and the cryptographic key management service may simply encrypt the sensitive data without generating verification information.

Figure 14:
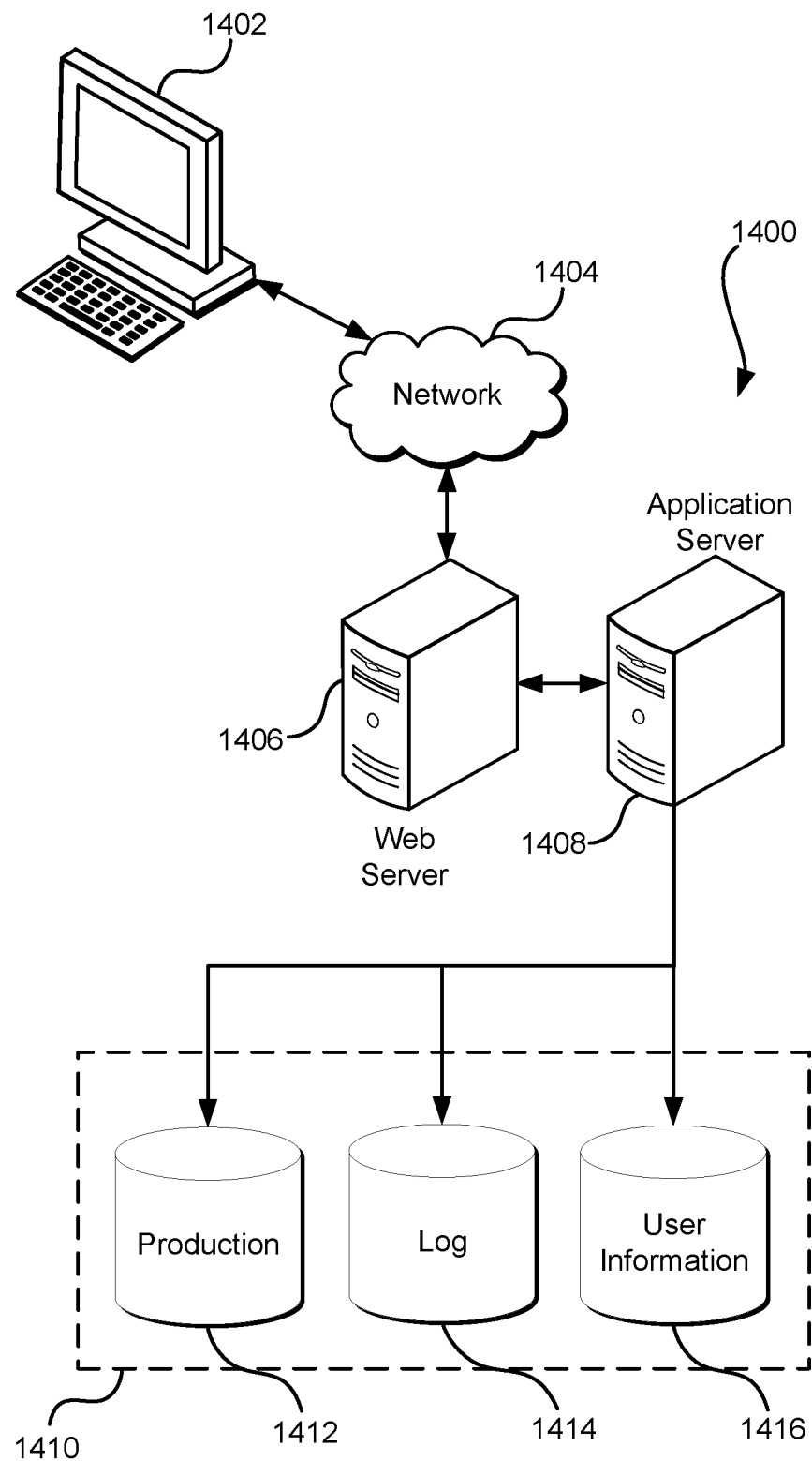
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications networks, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the electronic client device 1402 and the application server 1408, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

As discussed above, numerous cryptographic techniques may be used. Numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list. Other Example cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode. Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

Embodiments of the disclosure can be described in view of the following clauses:

1. A computer-implemented method, comprising:
   establishing a cryptographically protected communications session with a client;
   receiving, from the client and over the cryptographically protected communications session, a data object in a communication to be directed to a backend service endpoint;
   determining that a portion of the data object includes sensitive data based at least in part on configuration information that enable detecting sensitive data;
   encrypting the portion data object to result in an encrypted portion;
   updating the data object to include the encrypted portion, thereby resulting in a modified data object;
   generating a request to the backend service endpoint including the modified data object, the request including information indicating that the sensitive data has been protected; and
   transmitting the request to the backend service endpoint.

2. The computer-implemented method of any of the preceding clauses, wherein the computer-implemented method further comprises:
   receiving a second data object over the cryptographically protected communications session;
   determining the second data object does not include sensitive data; and
   transmitting a second request to the backend service endpoint including the second data object.

3. The computer-implemented method of any of the preceding clauses, wherein the computer-implemented method is executed within a secure environment including a kernel module that restricts interactions between processes and other resources.

4. The computer-implemented method of any of the preceding clauses, wherein the computer-implemented method further comprises receiving configuration information indicating data to be determined as sensitive, encryption information for encrypting data determined to be sensitive, and an encryption key associated with the backend service.

5. A system, comprising:
   at least one computing device implementing one or more services, wherein the one or more services:

receive, over a cryptographically protected communications session, a set of data objects directed towards a destination;

determine that a subset of data objects of the set of the data objects includes sensitive data based at least in part on configuration information, the configuration information enables detection of sensitive data and indicates an endpoint to transmit sensitive data based at least in part on a type associated with the sensitive data;

obfuscate the subset data objects to generate a set of encrypted data objects which can be decrypted by a backend service associated with the endpoint, the cryptographic key designated by the backend service;

modify the set of data objects to include the set of encrypted data object thereby generating a modified set of data objects; and transmit the modified set of data objects to an endpoint.

6. The system of clause 5, wherein generating the set of encrypted data objects further comprises encrypting the subset of data objects with the cryptographic key according to a symmetric encryption algorithm.

7. The system of clause 5 or 6, wherein the cryptographically protected communications session further comprises a Hypertext Transfer Protocol Secure (HTTPS) connection.

8. The system of clause 5 to 7, wherein the destination further comprises a service endpoint accessible to customers via a publicly addressable communications network.

9. The system of clause 5 to 8, wherein the configuration information further defines, for a set of endpoints of which the endpoint is a member: an encryption algorithm used to encrypt sensitive data, the encryption algorithm satisfying a security policy associated with the sensitive data, and one or more encryption keys.

10. The system of clause 5 to 9, wherein the at least one computing device implements the one or more services in an environment isolated from at least one other process executed by the at least one computing device based at least in part on the configuration information.

11. The system of clause 5 to 10, wherein the configuration information indicates a type of data that is sensitive data.

12. The system of clause 5 to 11, wherein generating the set of encrypted data objects further comprises encrypting the subset data objects using cryptographic material obtained from the configuration information.

13. The system of clause 5 to 11, wherein the subset of data objects is obfuscated by encrypting the subset of data objects using a cryptographic key identified in the configuration information.

14. A non-transitory computer-readable storage medium having stored thereon executable instructions that, as a result of being executed by one or more processors of a computer system, cause the computer system to at least:

receive a request including a set of encrypted data objects directed towards a service endpoint implemented by another computer system, the request received in a data stream generated by the other computer system;

decrypt the set of encrypted data objects to generate a set of data objects;

determine that one or more data objects of the set of the data objects includes data not to be exposed to one or more intermediaries along one or more routes between the computer system and the service endpoint;

encrypt the one or more data objects to generated one or more encrypted data object;

modify the request by at least replacing the one or more data objects of the set of data objects with the one or more encrypted data objects; and forward the request to the service endpoint.

15. The non-transitory computer-readable storage medium of clause 13, wherein the instructions further comprise instructions that, as a result of being executed by the one or more processors, cause the computer system to establish a cryptographically protected communications session with a client device and the service endpoint, the client device responsible to transmitting the request.

16. The non-transitory computer-readable storage medium of clause 13 or 14, wherein the service endpoint is associated with a service of a plurality of services and the computer system processes request for the service.

17. The non-transitory computer-readable storage medium of clause 13 to 15, wherein the request is a HTTP POST request.

18. The non-transitory computer-readable storage medium of clause 13 to 16, wherein the instructions further comprise instructions that, as a result of being executed by the one or more processors, cause the computer system to determine, based at least in part on one or more headers included in the request, the request is directed towards the service endpoint.

19. The non-transitory computer-readable storage medium of clause 13 to 17 wherein the instructions that cause the computer system to determine the one or more data objects of the set of the data objects includes data not to be exposed further include instructions that cause the computer system to determine the one or more data objects includes a payment information of a user associated with the request.

20. The non-transitory computer-readable storage medium of clause 13 to 18, wherein the instructions that cause the computer system to determine the one or more data objects of the set of the data objects includes data not to be exposed further include instructions that cause the computer system to determine that the one or more data objects includes payment information.

21. The non-transitory computer-readable storage medium of clause 13 to 19, wherein the instructions that cause the computer system to determine that the one or more data objects of the set of the data objects includes data not to be exposed further include instructions that cause the computer system to determine the one or more data objects include data not to be exposed based at least in part on one or more fields associated with the one or more data objects.

22. The non-transitory computer-readable storage medium of clause 14, wherein the computer system is a network edge device.

23. A computer-implemented method, comprising:

receiving data from a data stream transmitted by a backend service, that data stream directed towards a client device;

detecting an encrypted data object in the data obtained from the data stream;

decrypting the encrypted data object to obtain a decrypted data object;

inserting the decrypted data object in the data stream to result in a modified data stream; and transmitting the modified data stream to the client device.

24. The computer-implemented method of clause 23, wherein the modified data stream further comprises a webpage, and wherein the method comprises rendering the data stream prior to inserting the decrypted data object in the data stream.

25. The computer-implemented method of clause 23 or 24, wherein decrypting the encrypted data object further comprises transmitting a request to a cryptographic key management service to decrypt an encrypted cryptographic key obtained from the encrypted data object.

26. The computer-implemented method of clause 23 to 25, wherein detecting the encrypted data object further comprises obtaining a flag from the data stream indicating the encrypted data object.

27. A system, comprising:
at least one computing device implementing one or more services, wherein the one or more services:
receive a set of data objects from a backend service for embedding in content, the set of data objects directed towards an endpoint;
detect, in the set of data objects, a subset of data objects of the set of data objects having a property;
modify the subset of data objects to generate a modified set of data objects;
include the modified set of data objects in the content to result in updated content; and
forward the updated content to the endpoint.

28. The system of clause 27, wherein modifying the subset of data objects further comprises decrypting the subset of data objects.

29. The system of clause 27 or 28, wherein decrypting the subset of data objects further comprises transmitting an application program interface (API) command to a key management service to decrypt the subset of data objects.

30. The system of clause 27 to 29, wherein decrypting the subset of data objects further comprises obtaining decrypted data from a decryption module executed by a process of the at least one computing system.

31. The system of clause 27 to 30, wherein the process is executed in an isolated computing environment maintained by an operating system executed by the at least one computing device.

32. The system of clause 27 to 31, wherein the system detects the subset of data objects as a result of a flag in a stream of data that includes the set of data objects, the flag indicating a start location and an end location for the subset of data objects.

33. The system of clause 27 to 32, wherein the one or more services further forward a second subset of the set of data objects to the endpoint without modifying an individual data object in the second subset of data objects.

34. The system of clause 27 to 33, wherein modifying the subset of data objects further comprises modifying a value displayed by the subset of data objects as a result of being rendered as an element of a webpage.

35. A non-transitory computer-readable storage medium having stored thereon executable instructions that, as a result of being executed by one or more processors of a computer system, cause the computer system to at least:
receive a stream of data associated with a destination;
detect obfuscated data in the stream of data;
de-obfuscate the obfuscated data to obtain plaintext data;
replace at least a portion of the data in the stream of data with the plaintext data; and
provide the data stream to the destination.

36. The non-transitory computer-readable storage medium of clause 35, wherein the instructions further comprise instructions that, as a result of being executed by the one or more processors, cause the computer system to delay processing of the stream of data until the plaintext data is generated.

37. The non-transitory computer-readable storage medium of clause 35 or 36, wherein the obfuscated data is obfuscated by encryption and wherein the instructions further comprise instructions that, as a result of being executed by the one or more processors, cause the computer system to obtain configuration information including key material to decrypt the encrypted obfuscated data.

38. The non-transitory computer-readable storage medium of clause 35 to 37, wherein the instructions further comprise instructions that, as a result of being executed by the one or more processors, cause the computer system to verify a signature associated with a backend service to determine that the destination is authorized to receive the data stream.

39. The non-transitory computer-readable storage medium of clause 35 to 38, wherein the instructions further comprise instructions that, as a result of being executed by the one or more processors, cause the computer system to cause the plaintext data to be removed from the stream of data a result of failing to verify the signature.

40. The non-transitory computer-readable storage medium of clause 35 to 38, wherein the instructions further comprise instructions that, as a result of being executed by the one or more processors, cause the computer system to establish a cryptographically protected communication with the destination; and
wherein the data stream is provided to the destination over the cryptographically protected communication.

41. The non-transitory computer-readable storage medium of clause 35 to 40, the data stream includes content of a web site.

42. The non-transitory computer-readable storage medium of clause 35 to 41, wherein the obfuscated data include data classified as sensitive data.

43. The non-transitory computer-readable storage medium of claims 35 to 42, wherein the computer system is a network edge device.

44. A computer-implemented method, comprising:
receiving a first request at a network edge device, the first request directed to a backend service of a plurality of backend services;
detecting, based at least in part on configuration information for the backend service that enables detection of sensitive data, a sensitive data item in plaintext form included in the request;
providing the sensitive data item to a data encryption module to obtain an encrypted sensitive data item;
generating a second request based at least in part on the first request, the second request generated to include the encrypted sensitive data item but to lack the sensitive data item in plaintext form; and
transmitting the second request to the backend service without transmitting the first request to the backend service.

45. The computer-implemented method of clause 44, wherein:
computer-implemented method further comprises obtaining configuration information causing execution of an isolated environment within the network edge device; and
wherein the encryption module is executed within the isolated environment.

46. The computer-implemented method of clause 44 or 45, wherein generating the second request to the backend service further comprises indicating a length of the sensitive data in the request to enable the backend service to distinguish the sensitive data from other data.

47. The computer-implemented method of any of clauses 44 to 46, wherein generating the second request further comprises modifying a format of the second request such that length information such that the sensitive data is distinguishable from other information without length information.

48. A system, comprising:
at least one computing device implementing one or more services, wherein the one or more services:
obtain, at an edge device, a request associated with a data stream generated by a backend service;
determine that the request includes sensitive data based at least in part on configuration information;
obfuscate the sensitive data to generate obfuscated sensitive data;
generate a second request to replace the sensitive data included in the request with the obfuscated sensitive data; and
transmit the second request the backend service.

49. The system of clause 48, wherein obfuscating the sensitive data further comprises encrypting the sensitive data using a public key associated with the backend service.

50. The system of clause 48 or 49, wherein determining that the request includes sensitive data further comprises determining the request includes sensitive data based at least in part on a data type of a data object included in the request.

51. The system of any of clauses 48 to 50, wherein determining that the request includes sensitive data is based at least in part on a flag associated with a portion of data included in the request, the flag indicated in the configuration information.

52. The system of any of clauses 48 to 51 wherein obfuscating the sensitive data further comprises encrypting the sensitive data using a process that involves transmitting an application program interface (API) request to a cryptographic key management service implemented by a computing resource service provider.

53. The system of clause 52, wherein the sensitive data is encrypted with a first key and the key management service encrypts the first key with a second key to generate an encrypted first key; and
wherein generating the second request further comprises including the encrypted first key in the second request.

54. The system of any of clauses 48 to 53, wherein generating the second request further comprises including authentication information associated with the backend service in the second request.

55. The system of any of clauses 48 to 54, wherein the edge device is a computing device of a content delivery network.

56. A non-transitory computer-readable storage medium having stored thereon executable instructions that, as a result of being executed by one or more processors of a computer system, cause the computer system to at least:
receive, at a network edge device, a request included in a data stream;
determine to obfuscate a portion of the request based at least in part on information included in the request indicating the request includes sensitive data;
obfuscate the sensitive data to generate an obfuscated sensitive data object;
process the request to replace the sensitive data with the obfuscated sensitive data object to generate a modified request; and
transmit the modified request to a destination.

57. The non-transitory computer-readable storage medium of clause 56, wherein the instructions that cause the computer system to receive the request further include instructions that cause the computer system to establish a cryptographically protected communications session with a client device and the network edge device and receive the request over the cryptographically protected communications session.

58. The non-transitory computer-readable storage medium of clause 56-57, wherein the network edge device contains different configuration information for a plurality of backend services.

59. The non-transitory computer-readable storage medium of any of clauses 56-58, wherein the different configuration information for the plurality of backend services cause the network edge device to executed a plurality of isolated processes based at least in part on the different configuration information.

60. The non-transitory computer-readable storage medium of any of clauses 56-59, wherein sensitive data is obfuscated using an encryption module that is executed by a computing device distinct from the network edge device and connected to the network edge device.

61. The non-transitory computer-readable storage medium of clause 60, wherein the computing device is connected to the network edge device using a cryptographically protected communications channel.

62. The non-transitory computer-readable storage medium of any of clauses 56-61, wherein obfuscating the sensitive data further comprises an encryption module transmitting a service call to a cryptographic key management system.

63. The non-transitory computer-readable storage medium of any of clauses 56-62, wherein the encryption module further comprises a module executed by the network edge device. Other variations are within the spirit of the present disclosure.

Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a first request at a network edge device, wherein the network edge device uses the first request to determine a backend service of a plurality of backend services and obtains configuration information provided by the backend service from different configuration information provided by the plurality of backend services;
   detecting, based at least in part on the configuration information that enables detection of sensitive data received from the backend service that the first request is directed to, a sensitive data item in plaintext form included in the first request;
   providing the sensitive data item to a data encryption module;
   encrypting the sensitive data item with a first key, based at least in part on the first request and the configuration information provided by the backend service, to generate a second request, the second request generated based at least in part on the configuration information provided by the backend service and to include the first key encrypted with a second key by a cryptographic key management service and to include the encrypted sensitive data item but to lack the sensitive data item in plaintext form; and
   transmitting the second request to the backend service without transmitting the first request to the backend service.

2. The computer-implemented method of claim 1, wherein:
   the computer-implemented method further comprises obtaining configuration information causing execution of an isolated environment within the network edge device; and
   wherein the data encryption module is executed within the isolated environment.

3. The computer-implemented method of claim 1, wherein the generating of the second request further comprises indicating a length of the sensitive data in the second request to enable the backend service to distinguish the sensitive data from other data.

4. The computer-implemented method of claim 1, wherein the generating of the second request further comprises modifying the format of the second request such that the sensitive data is distinguishable, without length information, from other information in the second request.

5. The computer-implemented method of claim 1, wherein the configuration information includes information to detect sensitive data, process sensitive data, encrypt sensitive data, apply an encryption algorithm to sensitive data, encryption keys, and endpoints to transmit encrypted sensitive data.

6. A system, comprising:
 memory storing instructions, as a result of being executed by at least one or more processors, cause the system to at least:
  obtain, at an edge device, a request associated with a data stream generated by a backend service, wherein the edge device uses the request to determine the backend service from a plurality of backend services and obtains configuration information generated by the backend service from different configuration information generated by the plurality of backend services;
  determine that the request includes sensitive data based at least in part on the configuration information generated by the backend service;
  obfuscate the sensitive data, based at least in part on the configuration information, to generate obfuscated sensitive data, wherein obfuscating the sensitive data comprises encrypting the sensitive data with a first key;
  generate a second request, based at least in part on the configuration information, to replace the sensitive data included in the request with the obfuscated sensitive data, wherein the second request includes the first key encrypted with a second key by a cryptographic key management service; and
  transmit the second request to the backend service.

7. The system of claim 6, wherein the obfuscating of the sensitive data further comprises encrypting the sensitive data using a public key associated with the backend service.

8. The system of claim 6, wherein the determining of the request includes sensitive data further comprises determining the request includes sensitive data based at least in part on a data type of a data object included in the request.

9. The system of claim 6, wherein the determining of the request includes sensitive data is based at least in part on a flag associated with a portion of data included in the request, the flag indicated in the configuration information.

10. The system of claim 6, wherein the obfuscating of the sensitive data further comprises encrypting the sensitive data using a process that involves transmitting an application program interface (API) request to the cryptographic key management service implemented by a computing resource service provider.

11. The system of claim 6, wherein the configuration information includes information to detect sensitive data, process sensitive data, encrypt sensitive data, apply an encryption algorithm to sensitive data, encryption keys, and endpoints to transmit encrypted sensitive data.

12. The system of claim 6, wherein the generating of the second request further comprises including authentication information associated with the backend service in the second request.

13. The system of claim 6, wherein the edge device is a computing device of a content delivery network.

14. A non-transitory computer-readable storage medium having stored thereon executable instructions that, as a result of being executed by one or more processors of a computer system, cause the computer system to at least:
 receive, at a network edge device, a request, wherein the network edge device determines that the request is directed to a backend service from a plurality of backend services and obtains configuration information provided by the backend service from different configuration information provided by the plurality of backend services;
 determine to obfuscate a portion of the request based at least in part on information included in the request indicating the request includes sensitive data, wherein the information indicates the configuration information provided by the backend service where the request is directed to;
 obfuscate the sensitive data, using the configuration information, to generate an obfuscated sensitive data object, wherein the obfuscating of the sensitive data comprises encrypting the sensitive data with a first key;
 process the request to replace the sensitive data with the obfuscated sensitive data object to generate a modified request, wherein the modified request includes the first key encrypted with a second key by a cryptographic key management service; and
 transmit the modified request to a destination.

15. The non-transitory computer-readable storage medium of claim 14, wherein the executable instructions that cause the computer system to receive the request further include instructions that cause the computer system to establish a cryptographically protected communications session with a client device and the network edge device and receive the request over the cryptographically protected communications session.

16. The non-transitory computer-readable storage medium of claim 14, wherein the network edge device contains different configuration information for a plurality of backend services.

17. The non-transitory computer-readable storage medium of claim 16, wherein the different configuration information for the plurality of backend services cause the network edge device to execute a plurality of isolated processes based at least in part on the different configuration information.

18. The non-transitory computer-readable storage medium of claim 14, wherein sensitive data is obfuscated using an encryption module that is executed by a computing device distinct from the network edge device and connected to the network edge device.

19. The non-transitory computer-readable storage medium of claim 18, wherein the computing device is connected to the network edge device using a cryptographically protected communications channel.

20. The non-transitory computer-readable storage medium of claim 14, wherein the obfuscating of the sensitive data further comprises an encryption module transmitting a service call to a cryptographic key management system.

21. The non-transitory computer-readable storage medium of claim 20, wherein the encryption module further comprises a module executed by the network edge device.

* * * * *